(12) United States Patent
Juluri et al.

(10) Patent No.: US 12,517,159 B2
(45) Date of Patent: Jan. 6, 2026

(54) MACHINE LEARNING BASED TUNING OF RADIO FREQUENCY APPARATUSES

(71) Applicant: VIASAT, INC., Carlsbad, CA (US)

(72) Inventors: Bala Krishna Juluri, San Diego, CA (US); Andrew S. Chika, San Diego, CA (US); Justin M. Hallas, San Marcos, CA (US); Timothy M. Beck, San Marcos, CA (US)

(73) Assignee: VIASAT, INC., Carlsbad, CA (US)

( * ) Notice: Subject to any disclaimer, the term of this patent is extended or adjusted under 35 U.S.C. 154(b) by 706 days.

(21) Appl. No.: 17/817,442

(22) Filed: Aug. 4, 2022

(65) Prior Publication Data

US 2024/0044961 A1 Feb. 8, 2024

(51) Int. Cl.
*G01R 29/08* (2006.01)
*G06N 7/01* (2023.01)
*G06N 20/00* (2019.01)

(52) U.S. Cl.
CPC ............ *G01R 29/08* (2013.01); *G06N 7/01* (2023.01); *G06N 20/00* (2019.01)

(58) Field of Classification Search
CPC .......... G06N 3/045; G06N 3/08; G06N 20/00; G06N 3/044; G06N 3/04; G06N 3/048;
(Continued)

(56) References Cited

U.S. PATENT DOCUMENTS 10,296,831 B2   5/2019   O'Shea
10,396,919 B1   8/2019   O'Shea et al.
(Continued)

FOREIGN PATENT DOCUMENTS

KR      102203222 B1    1/2021
WO      2020/234902 A1  11/2020
(Continued)

OTHER PUBLICATIONS

Debashri Roy, Machine Learning Based RF Transmitter Characterization in the Presence of Adversaries, Dissertation submitted in partial fulfillment of requirements for the degree of Doctor of Philosophy in the Department of Computer Science, College of Engineering and Computer Science, University of Central Florida, United States, 168 pages, Spring Term 2020. Major Professor: Mainak Chatterjee.
(Continued)

*Primary Examiner* — Ajibola A Akinyemi
(74) *Attorney, Agent, or Firm* — Vorys, Sater, Seymour and Pease, LLP; Michael Messinger

(57) ABSTRACT

Methods, systems, and/or devices for tuning the configuration settings of one or more RF apparatuses are provided. Various embodiments described herein regard a system that includes a radio frequency apparatus configured to operate based on a plurality of possible configuration settings to generate an output signal that is characterized by a performance metric. The system can also include a tuner that employs a machine learning engine having a training stage and an inference stage. The inference stage can be configured to, based on a machine learning model, search the possible configuration settings for a target configuration setting that results in the performance metric meeting defined bounds of an optimization threshold value.

35 Claims, 9 Drawing Sheets

(58) Field of Classification Search
CPC ............ G06N 3/084; G06N 5/02; G06N 7/01;
G06N 3/047; G06N 3/09; G06N 5/01;
G06N 3/0464; G06N 3/0985; G06N 3/02
USPC .......................................................... 455/73
See application file for complete search history.

(56) References Cited

U.S. PATENT DOCUMENTS

| | | | |
|---|---|---|---|
| 10,409,569 B1* | 9/2019 | Wang | G06N 3/045 |
| 10,581,469 B1 | 3/2020 | O'Shea et al. | |
| 10,594,027 B1 | 3/2020 | Arora et al. | |
| 10,643,153 B2 | 5/2020 | O'Shea | |
| 10,667,157 B2 | 5/2020 | Rahmati et al. | |
| 10,944,436 B1 | 3/2021 | Buckley | |
| 11,044,158 B2 | 6/2021 | Horne et al. | |
| 11,190,944 B2 | 11/2021 | Shima | |
| 11,240,103 B2 | 2/2022 | Chi et al. | |
| 2018/0102793 A1 | 4/2018 | Talty et al. | |
| 2019/0171965 A1 | 6/2019 | Ferguson, Jr. et al. | |
| 2020/0106175 A1 | 4/2020 | Moates | |
| 2021/0019652 A1* | 1/2021 | Gadelrab | G06F 11/3409 |
| 2021/0266036 A1 | 8/2021 | Namgoong et al. | |
| 2021/0304074 A1 | 9/2021 | Zaremoodi et al. | |
| 2021/0409056 A1 | 12/2021 | Talwalkar et al. | |
| 2023/0111375 A1* | 4/2023 | Clemons | G06N 3/08 706/15 |
| 2023/0318779 A1* | 10/2023 | Atawia | H04W 24/08 370/329 |

FOREIGN PATENT DOCUMENTS

| | | |
|---|---|---|
| WO | 2021087387 A1 | 5/2021 |
| WO | 2021/151477 A1 | 8/2021 |

OTHER PUBLICATIONS

Phillip Stanley-Marbell, et al. Machine Learning for Radio Frequency Applications, The Alan Turning Institute, nine pages, https://www.turning.ac.uk/research/interest-groups/machine-learning-radio-frequency-applications, printed Feb. 15, 2022.

Kenneth E. Kolodzief, Aidan U. Cookson, and Bradley T. Perry, Neural Network Tuning for Analog-RF Self-Interference Cancellation, MIT Lincoln Laboratory, Lexington, Massachusetts, USA, four pages, pp. 673-675, International Microwave Symposium 2021.

John Davies, Radio Frequency Machine Learning Systems Radio Frequency Machine Learning Systems (RFMLS), https://www.darpa.mil/program/radio-frequency-machine-learning-systems, two pages, printed Feb. 15, 2022.

Kenneth E. Kolodziej, Aidan U. Cookson, and Bradley T. Perry, RF Canceller Tuning Acceleration Using Neural Network Machine Learning for In-Band Full-Duplex Systems, RF Technology Group, Advanced Technology Division, MIT Lincoln Laboratory, Lexington, MA 02421, USA, 13 pages, pp. 1159-1170, revised May 6, 2021; accepted May 8, 2021. Date of publication May 14, 2021; date of current version May 25, 2021. vol. 2 2021 Communications Society.

Lauren J. Wong and Alan J. Michaels, Transfer Learning for Radio Frequency Machine Learning: A Taxonomy and Survey, Received: Jan. 20, 2022, Accepted: Feb. 9, 2022, Published: Feb. 12, 2022, Sensors 2022, 22, 1416. https://doi.org/10.3390/s22041416. https://www.mdpi.com/journal/sensors, 14 pages.

C.K. Williams, C.E. Rasmussen: Gaussian processes for machine learning, vol. 2. MIT Press Cambridge, MA (2006).

F. Hutter, H.H. Hoos, K. Leyton-Brown: Sequential model-based optimization for general algorithm configuration (extended version). Technical Report TR-2010-10, University of British Columbia, Computer Science, Tech. Rep. (2010).

Y. Sui, A. Gotovos, J. Burdick and A. Krause. (2015). Safe Exploration for Optimization with Gaussian Processes. <i>Proceedings of the 32nd International Conference on Machine Learning</i>, in <i>Proceedings of Machine Learning Research</i> 37:997-1005 Available from https://proceedings.mlr.press/v37/sui15.html.

F. Berkenkamp, A. Krause and A.P. Schoellig. Bayesian optimization with safety constraints: safe and automatic parameter tuning in robotics. Mach Learn (2021). https://doi.org/10.1007/s10994-021-06019-1.

Kevin Swersky, Jasper Snoek, and Ryan P. Adams, Multi-Task Bayesian Optimization, Advances in Neural Information Processing Systems 26 (NIPS 2013).

International Search Report and Written Opinion for PCT/US2023/027546, mailed Nov. 9, 2023.

* cited by examiner

MACHINE LEARNING BASED TUNING OF RADIO FREQUENCY APPARATUSES

TECHNICAL FIELD

The field relates to systems and computer-implemented methods for utilizing machine learning to tune operation parameters for one or more radio frequency apparatuses.

RELATED ART

Mixed-signal and radio frequency ("RF") apparatus are commonly used for digital communication. The performance of these apparatuses is subject to variations caused by intrinsic properties of the circuit components and/or assembly conditions. Consequently, RF apparatuses are designed with variable components that can be tuned to optimize performance. For example, one or more component configuration settings can be tuned so that the RF apparatus achieves desired outputs and/or measurements, as defined by a prescribed set of objectives (e.g., such as matched power gain and/or phase).

The RF apparatus's configuration settings can encompass a vast combinatorial space of potential parameter values regarding, for example: frequencies of operation, power levels, transistor bias levels, operational temperatures, a combination thereof, and/or the like. Thus, tuning the RF apparatus involves identifying one or more specific configuration settings from the combinatorial space that results in the desired performance.

Traditionally, the tuning is performed by subject matter experts, who rely on experience and industry knowledge to search for the optimal configuration settings via trial and error. However, manual tuning operations require a deep technical understanding or knowledge of the apparatus and its behavior, thereby necessitating product-specific training. Thus, manual tuning approaches are limited in their application, time consuming, costly, and/or inefficient. Attempts have been employed to automate RF apparatus tuning via a linear search process; however, typical automation approaches are still time consuming and not effective when the apparatus exhibits non-linear performance results. In addition, typical tuning approaches are not able to respond quickly to variations over time in the manufacturing process or changes in the underlying product technology.

SUMMARY

The following presents a summary to provide a basic understanding of one or more embodiments described herein. This summary is not intended to identify key or critical features, or to delineate any scope of particular embodiments and/or claims. The sole purpose of this summary is to present concepts in a simplified form as prelude to the more detailed description that is presented below. In one or more embodiments described herein, systems, computer-implemented methods, apparatuses, and/or computer program products that can tune the configuration settings of one or more RF apparatuses are described.

In an embodiment, a system includes a radio frequency apparatus that can be configured to operate based on a plurality of possible configuration settings to generate an output signal that is characterized by a performance metric. The system can further include a tuner that can employ a machine learning engine having a training stage and an inference stage. The inference stage can be configured to, based on a machine learning model, search the possible configuration settings for a target configuration setting that results in the performance metric meeting defined bounds of an optimization threshold value.

In another embodiments, the system also includes a tester that can control operation of the radio frequency apparatus based on a plurality of test configuration settings identified by the tuner. The target configuration setting can be from the plurality of test configuration settings. In one aspect, the radio frequency apparatus can be an amplifier, filter, digital signal processor, radio frequency integrated circuit, micro-electro-mechanical system filter, and/or monolithic microwave integrated circuit. In another aspect, the plurality of test configuration settings can modulate at least one parameter of the output signal and/or operating parameter of the radio frequency apparatus. Further, the at least one parameter of the output signal can include: amplitude variation, rise time, fall time, pulse width, output power, in-band spectral emissions, out-of-band spectral emissions, error vector magnitude, and/or a combination thereof. Also, the at least one operating parameter of the radio frequency apparatus can include: filter coefficient, output power, and/or a combination thereof.

In one or more embodiments, the performance metric can be a function of performance evaluation data that characterizes the output signal and/or the operating parameter of the radio frequency apparatus. In one aspect, the tuner can determine the performance metric by comparing the performance evaluation data to a target performance dataset. In another aspect, the tester can determine the performance metric by executing a loss function algorithm. Also, the defined bounds of the optimization threshold can be a range less than or equal to a defined loss value. In a further aspect, the loss function algorithm can be a correlation-based loss function algorithm or an error-based loss function algorithm.

In another embodiment, the machine learning engine can execute a Bayesian optimization algorithm to identify the plurality of test configuration settings based on historic performance metrics that characterize previous output signals generated by the radio frequency apparatus in response to operations controlled by the tester.

In a further embodiment, the tester can be a computer executable component stored in a computer readable storage medium comprised within the radio frequency apparatus.

In a still further embodiment, the tester can send the historic performance metrics to the tuner and receives the plurality of test configuration settings from the tuner via a cloud computing environment.

In a still further embodiment, the machine learning engine can include computer executable components that include an initialization component that selects an initial configuration setting from the plurality of possible configuration settings. Also, the system further can comprises a tester that controls operation of the radio frequency apparatus in accordance with the initial configuration setting. In one aspect, the initialization component can randomly select the initial configuration setting. In another aspect, the computer executable components can further include a model update components that tunes a hyperparameter of the machine learning model based on the performance metric that characterizes the output generated from a previously tested configuration setting. In a further aspect, the computer executable components further include a candidate component that selects a test configuration setting based on the tuned machine learning model. The tester can further control the operation of the radio frequency apparatus in accordance with the test configuration setting.

In another embodiment, the target configuration setting can optimize the radio frequency apparatus for use in a time-divisional multiple access digital communications network.

Another embodiment is drawn to a computer-implemented method for tuning a configuration setting of a radio frequency apparatus. The computer-implemented method can include applying a machine learning model to generate a test configuration setting for the radio frequency apparatus. Further, the computer-implemented method can include generating performance evaluation data by operating the radio frequency apparatus with the test configuration setting. Additionally, the computer-implemented method can include comparing the performance evaluation data to a target performance dataset to determine whether the test configuration setting is an optimal configuration setting for a defined objective.

A still further embodiment is drawn to a computer program product for tuning configuration settings of a radio frequency apparatus. The computer program product includes a computer readable storage medium having program instructions embodied therewith. The program instructions can be executable by one or more processors to cause the one or more processors to control an operation of a radio frequency apparatus using an initial configuration setting. Also, the program instructions can cause the one or more processors to update a machine learning model based on performance evaluation data characterizing the operation of the radio frequency apparatus. Further, the program instructions can cause the one or more processors to determine a test configuration setting for the radio frequency apparatus based on a prediction generated by the machine learning model regarding a second operation of the radio frequency apparatus using the test configuration setting.

Further embodiments, features, and advantages of the invention, as well as the structure and operation of the various embodiments of the invention are described in detail below with reference to accompanying drawings.

DETAILED DESCRIPTION

Figure 1:
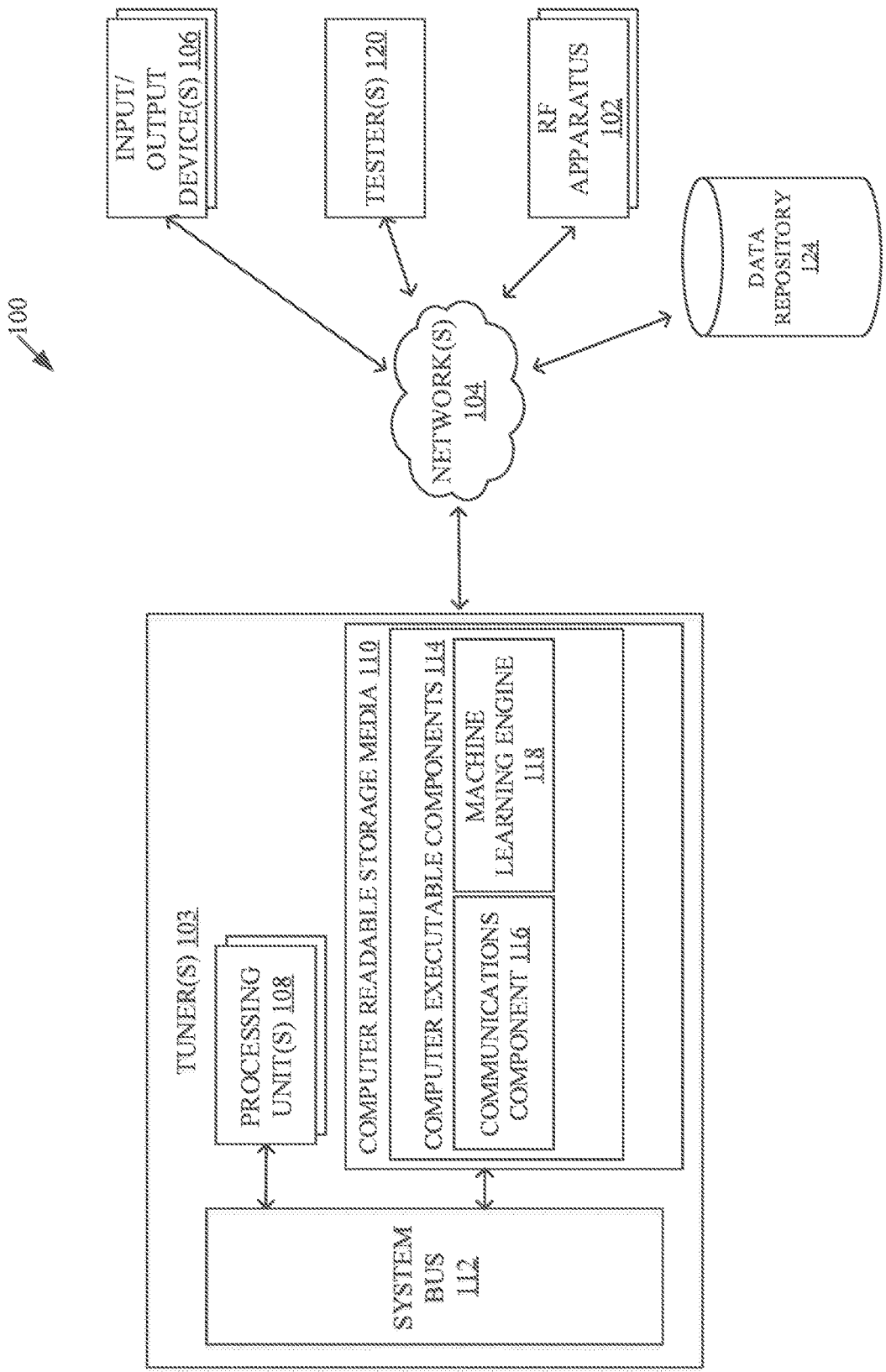
FIG. 1 illustrates a diagram of an example, non-limiting system that can tune the configuration settings of one or more RF apparatuses in accordance with one or more embodiments described herein.

The following detailed description is merely illustrative and not intended to limit the scope and/or use of embodiments. Furthermore, there is no intention to be bound by any expressed or implied information presented in the preceding Background or Summary sections, or in the following Detailed Description section.

One or more embodiments are now described with reference to the Drawings, where like referenced numerals are used to refer to like elements throughout. In the following Detailed Description, for purposed of explanation, numerous specific details are set forth in order to provide a more thorough understanding of the one or more embodiments. However, it is evident that one or more embodiments can be practiced without these specific details.

Embodiments refer to illustrations described herein with reference to particular applications. It should be understood that the present description is not limited to the embodiments. Those skilled in the art with access to the teachings provided herein will recognize additional modifications, applications, and embodiments within the scope there and additional fields in which the embodiments would be of significant utility.

Various embodiments described herein can regard tuning one or more RF apparatuses using machine learning. For example, one or more machine learning models can be employed to search a space of combinatorial configuration settings to identify settings that are predicted to achieve optimal performance metrics for the RF apparatus. Further, the RF apparatus can be operated with the identified settings, whereupon the performance data can be evaluated and used to update the machine learning model to improve the accuracy of subsequent predictions. For instance, the one or more machine learning models can operate in conjunction with one or more automated testing components that can control operation of the RF apparatus (e.g., change operational parameters in accordance with configuration settings identified by the machine learning model) and collect performance evaluation data to train and/or update the machine learning models. In one or more embodiments, the tuning process can comprise multiple iterations of: employing the machine learning model to identify test configuration settings; evaluating performance data associated with operating the one or more RF apparatuses with the test configuration settings; and updating the machine learning model based on the performance data evaluation.

Additionally, the one or more machine learning models can search a combinatorial configuration settings search space that includes parameter values for multiple RF apparatuses that can work in conjunction with each other. For example, the one or more tuning operations described herein can be employed to optimize complex and/or dynamic systems comprising multiple RF apparatuses working in tandem, such as systems comprising a ground station, a satellite, and/or a user terminal to conduct telecommunications. For instance, the optimal performance of a first RF apparatus can be based on the performance of a second RF apparatus (and/or vice versa), where the one or more machine learning models can analyze the performance data of both RF apparatuses in searching the combinatorial configuration settings space for controlling the parameters of the first RF apparatus and/or the second RF apparatus.

In one or more embodiments, the one or more machine learning models can be employed via a cloud computing environment to facilitate the tuning operations. For example, one or more automated testing components can communicate with, and/or share data with, the one or machine learning models via one or more wireless networks. Further, a cloud computing environment can be employed to facilitate a tuning system in which a machine learning model is operatively coupled to multiple testing components to tune the configuration settings for multiple RF apparatus. Thereby, the machine learning model can leverage lessons learned from tuning a first RF apparatus in tuning a second RF apparatus. In some embodiments, the one or more machine learning models and/or testing components can be housed within, and/or integrated with, the one or more RF apparatuses to facilitate a self-tuning operation.

The computer processing systems, computer-implemented methods, computer program products, and/or computer apparatuses described herein employ hardware and/or software to solve problems that are highly technical in nature (e.g., optimizing RF apparatus configuration settings from a vast combinatorial search space), which are not abstract and cannot be performed by the mental acts of a human. For example, an individual, or even a plurality of individuals, cannot search a vast combinatorial configuration settings space with the efficiency described herein. Additionally, one or more embodiments described herein can constitute one or more technical improvements over conventional tuning processes by utilizing machine learning models to account for parameter relationships that may be non-linear in nature. Further technical improvements achieved by the various embodiments described herein include: tuning for multiple objectives (e.g., prioritized objective tuning); performing multiple tuning operations in parallel; and/or utilizing transfer learning techniques to leverage lessons learned from similar knowledge domains.

As used herein, the term "machine learning" can refer to an application of artificial intelligence technologies to automatically and/or autonomously learn and/or improve from an experience (e.g., training data) without explicit programming of the lesson learned and/or improved upon. Various system components described herein can utilize machine learning (e.g., via supervised, unsupervised, and/or reinforcement learning techniques) to perform tasks such as classification, regression, and/or clustering. Execution of machine learning tasks can be facilitated by one or more machine learning models trained on one or more training datasets in accordance with one or more model configuration settings.

As used herein, the term "machine learning model" can refer to a computer model used to facilitate one or more machine learning tasks (e.g., regression and/or classification tasks). For example, a machine learning model can represent relationships (e.g., causal or correlation relationships) between parameters and/or outcomes within the context of a specified domain. For instance, machine learning models can represent the relationships via probabilistic determinations that can be adjusted, updated, and/or redefined based on historic data and/or previous executions of a machine learning task. In various embodiments described herein, machine learning models can simulate a number of interconnected processing units that can resemble abstract versions of neurons. For example, the processing units can be arranged in a plurality of layers (e.g., one or more input layers, hidden layers, and/or output layers) connected by varying connection strengths (e.g., which can be commonly referred to within the art as "weights").

Machine learning models can learn through training with one or more training datasets; where data with known outcomes in inputted into the machine learning model, outputs regarding the data are compared to the known outcomes, and/or the weights of the machine learning model are autonomously adjusted based on the comparison to replicate the known outcomes. As the one or more machine learning models train (e.g., utilize more training data), the machine learning models can become increasingly accurate; thus, trained machine learning models can accurately analyze data with unknown outcomes, based on lessons learned from training data and/or previous executions, to facilitate one or more machine learning tasks.

Example types of machine learning models can include, but are not limited to: artificial neural network ("ANN") models, perceptron ("P") models, feed forward ("FF") models, radial basis network ("RBF") models, deep feed forward ("DFF") models, recurrent neural network ("RNN") models, long/short memory ("LSTM") models, gated recurrent unit ("GRU") models, auto encoder ("AE") models, variational AE ("VAE") models, denoising AE ("DAE") models, sparse AE ("SAE") models, markov chain ("MC") models, Hopfield network ("HN") models, Boltzmann machine ("BM") models, deep belief network ("DBN") models, convolutional neural network ("CNN") models, deep convolutional network ("DCN") models, deconvolutional network ("DN") models, deep convolutional inverse graphics network ("DCIGN") models, generative adversarial network ("GAN") models, liquid state machine ("LSM") models, extreme learning machine ("ELM") models, echo state network ("ESN") models, deep residual network ("DRN") models, kohonen network ("KN") models, support vector machine ("SVM") models, and/or neural turing machine ("NTM") models.

As used herein, the term "transfer learning" can refer to one or more machine learning processes that utilize the knowledge gained from executing a first machine learning task in executing a second machine learning task. Transfer learning can be utilized to leverage lessons learned between different knowledge domains and/or between similar machine learning tasks. For instance, where a target knowledge domain lacks sufficient data to accurately train a machine learning model, a pre-trained machine learning model (e.g., pre-trained in another knowledge domain that shares similarities with the target knowledge domain) can be utilized to execute a machine learning task in the target knowledge domain. In another instance, transfer learning can utilize outcomes and/or model configuration settings from a pre-trained machine learning model to facilitate training another machine learning model in another knowledge domain.

As used herein, the term "transfer learning model" can refer to one or more machine learning models that are pre-trained and can be utilized in one or more transfer learning processes. For example, a transfer learning model can be trained to execute a first machine learning task, and utilized to execute, or facilitate execution, of a second, distinct machine learning task. Transfer learning models can be pre-existing machine learning models chosen from a library of models. Additionally, transfer learning models can be generated from the combination and/or alteration of one or more pre-existing machine learning models, where the transfer learning models can be fine-tuned based on one or more characteristics of the new data to be analyzed by the one or more subject machine learning tasks.

FIG. 1 illustrates a block diagram of an example, non-limiting system 100 that can tune adjustable settings of one or more RF apparatuses 102. One or more aspects of system 100 can constitute one or more machine-executable components that can be embodied within one or more computer readable mediums associated with one or more machines. For example, one or more machines (e.g., computers, computing devices, virtual machines, and/or the like) can execute the one or more machine-executable components to perform various operations described herein.

As shown in FIG. 1, the system 100 can comprise one or more tuners 103, networks 104, and/or input/output devices 106. The one or more tuners 103 can comprise one or more processing units 108 and/or computer readable storage media 110. In various embodiments, the one or more processing units 108 and computer readable storage media 110 can be operably coupled by one or more system buses 112. In various embodiments, the one or more tuners 103 can be, for example: a server, a desktop computer, a laptop, a hand-held computing apparatus, a programmable apparatus, a minicomputer, a mainframe computer, an Internet of Things ("IoT") device, a combination thereof, and/or the like.

In one or more embodiments, the computer readable storage media 110 can be distributed across a cloud computing environment and remotely accessible (e.g., by the one or more processing units 108) via the one or more networks 104. The computer readable storage media 110 can comprise one or more memory units and can store one or more computer executable components 114, which can be executed by the one or more processing units 108. The one or more computer executable components 114 can comprise, for example, communications component 116 and/or machine learning engine 118. The system 100 can also comprise one or more testers 120 and/or data repositories 124. As shown in FIG. 1, the one or more input/output devices 106, testers 120, RF apparatuses 102, and/or data repositories 124 can be operatively coupled to the one or more tuners 103 and/or each other via the one or more networks 104.

The one or more RF apparatuses 102 can be electronic-electrical devices capable of emitting radio frequency energy (e.g., by radiation, conduction, and/or induction) via circuitry that operates in the radio and/or satellite frequency spectrum (e.g., operating in the L-, Ka-, C-, or Ku-band). Example RF apparatuses 102 can include, but are not limited to: amplifiers, filters, digital signal processors, radio frequency integrated circuits ("RFIC"), micro-electro-mechanical system filters ("MEMS"), monolithic microwave integrated circuits ("MMIC"), multi-channel radios, satellite terminals (e.g., airborne terminals, marine terminals, ground terminals, and/or fixed broadband terminals), a combination thereof, and/or the like. For instance, the one or more RF apparatuses 102 can be user terminals, satellites, and/or gateway devices used in a satellite communications system. In accordance with various embodiments described herein, the one or more RF apparatuses 102 can comprise one or more variable components (e.g., field programmable grid arrays ("FPGAs"), microcontrollers, integrated circuits, transceivers, radio modems, wireless modems, and/or the like) that can be adjusted to alter the operation of the one or more RF apparatuses 102.

In various embodiments, the one or more RF apparatuses 102 can be filters, amplifiers, and/or other RF apparatuses 102 that can be manipulated in the digital domain and/or the analog domain. Digital manipulation can include the digital settings of IC operating parameters. For example, a FPGA acting as a DSP can be configured with one or more filter coefficients, such as in a finite impulse response ("FIR") filter. Digitally controlled amplifiers can have adjustable configuration controls that modulate various RF parameters, such as: gain, phase, band flatness, and/or the like. Tunable RF MEMS filters can also be adjusted and/or reconfigured to change the impedance of a circuit or filter. Additionally, a cascaded system combining one or more analog tunable amplifiers, filters, DSPs, RFICs, MMICs, or MEMS can be tuned to match individual components or achieve a target operational performance for a specific frequency space.

The one or more tuners 103 can utilize machine learning to tune the configuration settings of the one or more RF apparatuses 102. The tuning operations performed by the tuners 103 can adjust the performance of the one or more RF apparatuses 102 to meet one or more defined performance and/or optimization thresholds (e.g., set by one or more users of the system 100 via the one or more input/output devices 106). In accordance with the various embodiments described further herein, the one or more tuners 103 can employ machine learning models that characterize probabilistic relationships between parameter values controlled by the RF apparatus 102 configuration settings. Additionally, the one or more tuners 103 can utilize historic performance data regarding operation of the one or more RF apparatuses 102 to improve the accuracy and/or precision of subsequent tuning operations. In various embodiments, the one or more tuners 103 can tune the configuration settings of the one or more RF apparatuses 102 such that the one or more RF apparatuses are optimized to provide a defined level of performance; while minimizing the number of iterations in the tuning operation. For example, the one or more tuners 103 can utilize sequential machine learning model-based Bayesian optimization techniques to reduce the number of test operations required during the tuning operation.

In various embodiments, the one or more processing units 108 can comprise any commercially available processor. For example, the one or more processing units 108 can be a general purpose processor, an application-specific system processor ("ASSIP"), an application-specific instruction set processor ("ASIPs"), or a multiprocessor. For instance, the one or more processing units 108 can comprise a microcontroller, microprocessor, a central processing unit, and/or an embedded processor. In one or more embodiments, the one or more processing units 108 can include electronic circuitry, such as: programmable logic circuitry, FPGA, programmable logic arrays ("PLA"), an IC, and/or the like.

In various embodiments, the one or more computer executable components 114 can be program instructions for carrying out one or more operations described herein. For example, the one or more computer executable components 114 can be, but are not limited to: assembler instructions, instruction-set architecture ("ISA") instructions, machine instructions, machine dependent instructions, microcode, firmware instructions, state-setting data, configuration data, source code, object code, a combination thereof, and/or the like. For instance, the one or more computer executable components 114 can be written in one or more procedural programming languages. Although FIG. 1 depicts the computer executable components 114 stored on the one or more tuners 103, the architecture of the system 100 is not so limited. For example, the one or more computer executable components 114 can be stored on one or more computer readable storage media 110 that are external to the one or more tuners 103.

The one or more computer readable storage media 110 can include, but are not limited to: an electronic storage device, a magnetic storage device, an optical storage device, an electromagnetic storage device, a semiconductor storage device, a combination thereof, and/or the like. For example, the one or more computer readable storage media 110 can comprise: a portable computer diskette, a hard disk, a random access memory ("RAM") unit, a read-only memory ("ROM") unit, an erasable programmable read-only memory ("EPROM") unit, a CD-ROM, a DVD, Blu-ray disc, a memory stick, a combination thereof, and/or the like. The computer readable storage media 110 can employ transitory or non-transitory signals. In one or more embodiments the computer readable storage media 110 can be tangible and/or non-transitory. In various embodiments, the one or more computer readable storage media 110 can store the one or more computer executable components 114 and/or one or more other software applications, such as: a basic input/output system ("BIOS"), an operating system, program modules, executable packages of software, and/or the like. Also, the one or more of the computer executable components 114 described herein can be shared between multiple tuners 103 comprised within the system 100 via the one or more networks 104.

As shown in FIG. 1, the one or more computer executable components 114 can comprise a communications component 116 and/or machine learning engine 118. In various embodiments, the communications component 116 can facilitate data sharing between the one or more tuners 103 and the one or more RF apparatuses 102, input/output devices 106, testers 120, and/or data repositories 124. For instance, the communications component 116 can process data received via the one or more networks 104, and share the received data with one or more associate computer executable components 114. In one or more embodiments, the communications component 116 can be a part of a data communication system.

The machine learning engine 118 can execute one or more machine learning algorithms to execute a machine learning task, such as a tuning operation that identifies test configuration settings that are predicted to improve the performance of the one or more RF apparatuses 102. In various embodiments, the machine learning engine 118 can comprise: a training stage (e.g., exemplified by training stage 400 in FIG. 4), where one or more machine learning models 206 are trained; and/or an inference stage (e.g., exemplified by inference stage 401 in FIG. 4), where the machine learning engine 118 can be configured to, based on the machine learning model, search the possible configuration settings that can be implemented by the one or more RF apparatuses 102 for a target configuration setting that enables the one or more RF apparatuses 102 to achieve a defined level of optimal performance.

The one or more networks 104 can comprise one or more wired and/or wireless networks, including, but not limited to: a cellular network, a wide area network ("WAN"), a local area network ("LAN"), a combination thereof, and/or the like. One or more wireless technologies that can be comprised within the one or more networks 104 can include, but are not limited to: wireless fidelity ("Wi-Fi"), a WiMAX network, a wireless LAN ("WLAN") network, BLUETOOTH® technology, a combination thereof, and/or the like. For instance, the one or more networks 104 can include the Internet and/or the Internet of Things ("IoT"). In various embodiments, the one or more networks 104 can comprise one or more transmission lines (e.g., copper, optical, or wireless transmission lines), routers, gateway computers, and/or servers. Further, the one or more tuners 103 can comprise one or more network adapters and/or interfaces (not shown) to facilitate communications via the one or more networks 104.

In various embodiments, the one or more input/output devices 106 can be employed to enter data and/or commands into the system 100. Example data that can be entered via the one or more input/output devices 106 can include, but are not limited to: tuning objectives, optimization threshold values and/or measurements, RF apparatus 102 operation constraints, domain knowledge, RF apparatus 102 specification data and/or metadata, a combination thereof, and/or the like. For instance, the one or more input/output devices 106 can be employed to initialize and/or control one or more operations of the one or more tuners 103 (and/or associate components), testers 120, and/or RF apparatuses 102. In various embodiments, the one or more input/output devices 106 can comprise and/or display one or more input interfaces (e.g., a user interface) to facilitate entry of data into the system 100. Additionally, in one or more embodiments the one or more input/output devices 106 can be employed to define one or more system 100 settings, parameters, definitions, preferences, thresholds, and/or the like. Also, in one or more embodiments the one or more input/output devices 106 can be employed to display one or more outputs from the one or more tuners 103 and/or query one or more system 100 users. For example, the one or more input/output devices 106 can send, receive, and/or otherwise share data (e.g., inputs and/or outputs) with the one or more tuners 103 (e.g., via a direct electrical connection and/or the one or more networks 104).

The one or more input/output devices 106 can comprise one or more computer devices, including, but not limited to: desktop computers, servers, laptop computers, smart phones, smart wearable devices (e.g., smart watches and/or glasses), computer tablets, keyboards, touch pads, mice, augmented reality systems, virtual reality systems, microphones, remote controls (e.g., an infrared or radio frequency remote control), stylus pens, biometric input devices, a combination thereof, and/or the like. Additionally, the one or more input/output devices 106 can comprise one or more displays that can present one or more outputs generated by, for example, the tuner 103. Example displays can include, but are not limited to: cathode tube display ("CRT"), light emitting diode display ("LED"), electroluminescent display ("ELD"), plasma display panel ("PDP"), liquid crystal display ("LCD"), organic light-emitting diode display ("OLED"), a combination thereof, and/or the like. In various embodiments, the one or more input/output devices 106 can present one or more outputs of the one or more tuners 103, testers 120, and/or RF apparatuses 102 via an augmented reality environment or a virtual reality environment.

The one or more testers 120 can control operations of the one or more RF apparatuses 102 to test configuration settings identified by the one or more tuners 103. For example, the one or more testers 120 can execute one or more test operations with the one or more RF apparatuses 102. The one or more test operations can control the one or more RF apparatuses 102 in accordance with one or more test configuration settings provided by the one or more tuners 103 and/or one or more task settings (e.g., included in the task data 304 exemplified in the tuning operation 300 of FIG. 3) defined by the one or more input/output devices 106. The one or more test configuration settings can define values for one or more variable components of the one or more RF apparatuses 102. For example, the one or more test configuration settings can define values regarding, but not limited to: voltage, frequency range, filter coefficients, a combination thereof, and/or the like. The one or more task settings can define one or more tasks to be executed by the one or more RF apparatuses 102 during the test operations. For example, the one or more task settings can define: one or more operational constraints of the test operations, one or more task objectives to be accomplished by execution of the test operations, one or more operation protocols to be executed via the test operations, a combination thereof, and/or the like. In various embodiments, the one or more testers 120 can retrieve historic task settings from the one or more data repositories 124.

In one or more embodiments, the one or more testers 120 can further collect one or more outputs generated by the one or more RF apparatuses 102 during the test operations. Based on the one or more collected outputs, the one or more testers 120 can generate performance evaluation data that characterizes the performance quality of the one or more RF apparatuses 102 as a result of operation in accordance with the test configuration settings. The one or more outputs collected by one or more testers 120 can be, for instance: products generated by one or more RF apparatuses 102, one or more measured metrics regarding products generated by the one or more RF apparatuses 102, internal data regarding the operation of the one or more RF apparatuses 102, a combination thereof, and/or the like.

In various embodiments, the one or more testers 120 can share the collected data directly with the one or more machine learning engines 118 as performance evaluation data. In some embodiments, the one or more testers 120 can execute one or more data processing techniques to render the collected outputs as evaluation data, sharable with the one or more machine learning engines 118 in accordance with various embodiments described further herein. For instance, the one or more testers 120 can structure and/or format the one or more outputs into performance evaluation data that can be readily analyzed by the one or more machine learning engines 118.

The one or more data repositories 124 can comprise historic data regarding past: operations of the one or more RF apparatuses; determinations by the one or more tuners 103 (e.g., test configuration settings and/or optimal configuration settings); parameters and/or task settings defined by the one or more input/output devices 106; a combination thereof, and/or the like. For example, the one or more data repositories 124 can store logs (e.g., tables, charts, graphs, and/or the like) of previously utilized configuration settings and associate RF apparatus 102 performance evaluation data. Additionally, the one or more data repositories 124 can comprise a library of transfer learning models 122. As shown in FIG. 1, the one or more data repositories 124 can be operably coupled to, and thereby share data with, the one or more: tuners 103, input/output devices 106, testers 120, and/or RF apparatuses 102.

In various embodiments, the one or more data repositories 124 can include one or more transfer learning models, which can be machine learning models pre-trained with regards to one or more previous machine learning tasks. For example, the one or more transfer learning models can include pre-trained machine learning models trained on data characterizing respective types of RF apparatuses 102. In another example, the one or more transfer learning models can include pre-trained machine learning models trained to optimize the configuration settings of other types of devices (e.g., devices other than the one or more RF apparatuses 102).

Figure 2:
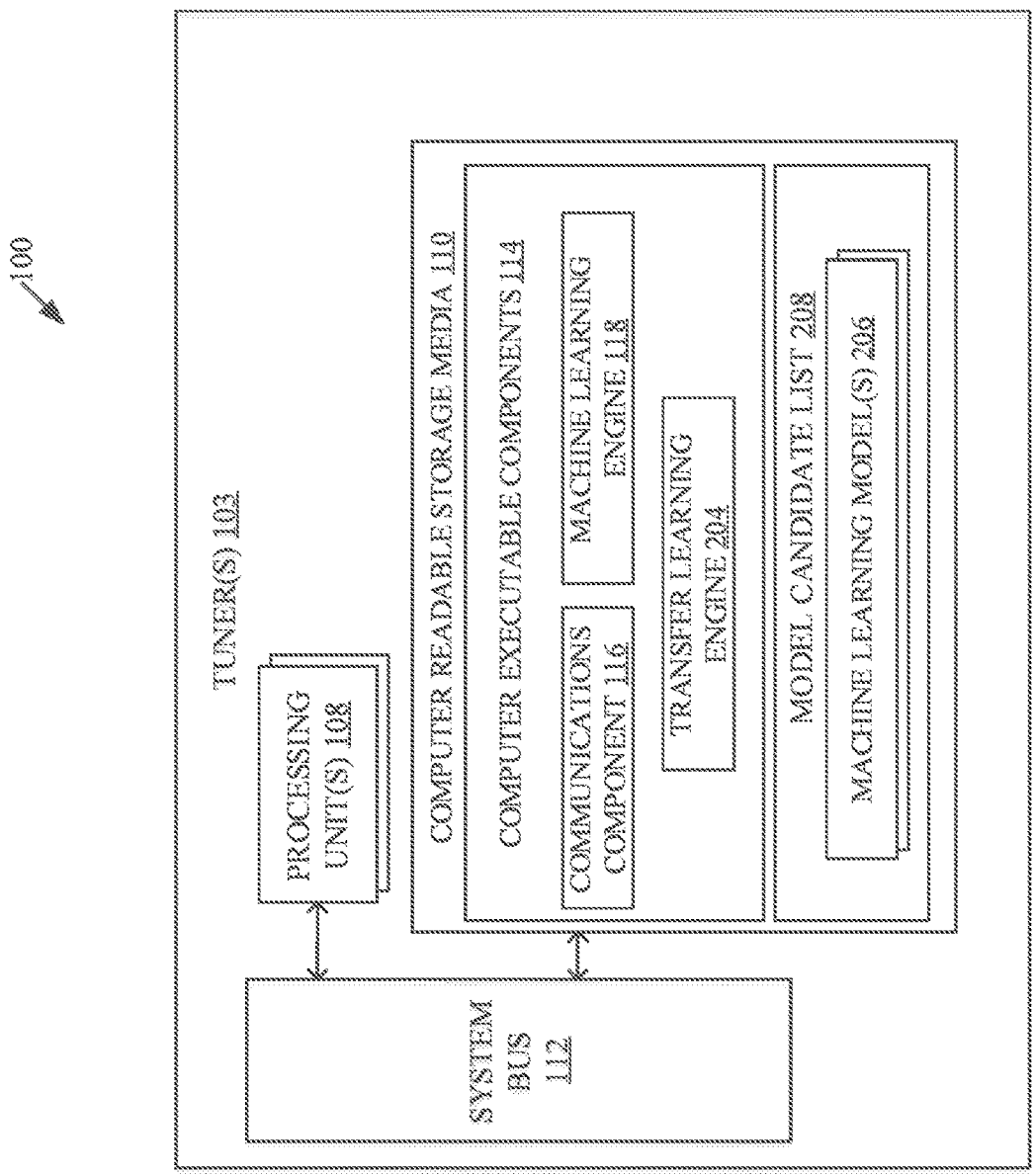
FIG. 2 illustrates a diagram of the example, non-limiting system comprising one or more machine learning models that can be utilized by one or more machine learning engines to analyze a combinatorial parameter space characterizing potential configuration settings for one or more RF apparatuses in accordance with one or more embodiments described herein.

FIG. 2 illustrates a diagram of the example, non-limiting tuner 103 further comprising transfer learning engine 204 and/or one or more machine learning models 206 in accordance with various embodiments described herein. As shown in FIG. 2, the transfer learning engine 204 and/or machine learning models 206 can be comprised within the computer readable storage media 110 of the one or more tuners 103. However, embodiments in which the transfer learning engine 204 and/or machine learning models 206 are remotely accessed by the one or more tuners 103 (e.g., via the one or more networks 104) are also envisaged.

In one or more embodiments, the machine learning engine 118 can generate and/or train a new machine learning model 206 for each tuning operation performed by the one or more tuners 103. Alternatively, the machine learning engine 118 can select a machine learning model 206 from a model candidate list 208 comprising a plurality of previously generated machine learning models 206 that can be utilized, further trained, and/or adjusted to execute the given tuning operation. For example, the model candidate list 208 can be populated with one or more machine learning models 206 previously employed by the one or more tuners 103 to tune a respective RF apparatus 102 and/or a respective type of RF apparatus 102 (e.g., another RF apparatus 102 from the same product line).

Additionally, one or more of the machine learning models 206 included in the model candidate list 208 can be transfer learning models identified by the transfer learning engine 204. For example, one or more of the machine learning models 206 can be transfer learning models previously trained during one or more tuning operations of an RF apparatuses 102 other than the respective RF apparatus 102 currently subject to tuning. In another example, one or more of the machine learning models 206 can be transfer learning models trained on RF apparatus 102 performance data for one or more other machine learning tasks (e.g., other than the one or more tuning operations described herein). In a further example, one or more of the machine learning models 206 can be transfer learning models trained for tuners other than the one or more RF apparatuses 102.

In various embodiments, the transfer learning engine 204 can identify one or more transfer learning models for inclusion in the model candidate list 208 based on one or more similarities in, for example, the parameter space of the model and the variable parameters influenced by the configuration settings of the RF apparatuses 102. For instance, the transfer learning engine 204 can compare the variable components included in the one or more RF apparatuses 102 selected for tuning with the internal components of one or more devices analyzed by the transfer learning model. Where the one or more RF apparatuses 102 and other devices share the same internal components, potential settings configurations, operational constraints, and/or perform similar functions; the transfer learning engine 204 may populate the model candidate list 208 with the associate transfer learning model.

In various embodiments, the one or more machine learning models 206 can be, for example, multi-layer ANN models. For example, the one or more machine learning models 206 can be ANN models comprising interconnected input layers, a plurality of hidden layers, and/or output layers. The input layers can regard parameter values controllable via variable components of the one or more RF apparatuses 102. The output layers can regard evaluation data characterizing output signals and/or operation features of the one or more RF apparatuses 102. Further, the plurality of hidden layers can be interconnected between the input and output layers via a plurality of nodes and/or edges (e.g., with associate weight values). For instance, the hidden layers can be fully-connected layers having multiple nodes. In various embodiment, the one or more machine learning models 206 can be regression models that map tuning parameters to predicted RF apparatus 102 performance results. For example, the one or more machine learning models 206 can be response surface models, such as Gaussian process ("GP") models and/or random forest models, that can be utilized by the machine learning engine 118 via one or more sequential model-based optimization algorithms in accordance with one or more embodiments described herein. For instance, the one or more machine learning models 206 can represent probabilistic relationships between configuration settings and predicted performance data, where each mapped relationship can have an associate probability indicative of the model's confidence in the accuracy of the predicted result.

Figure 3:
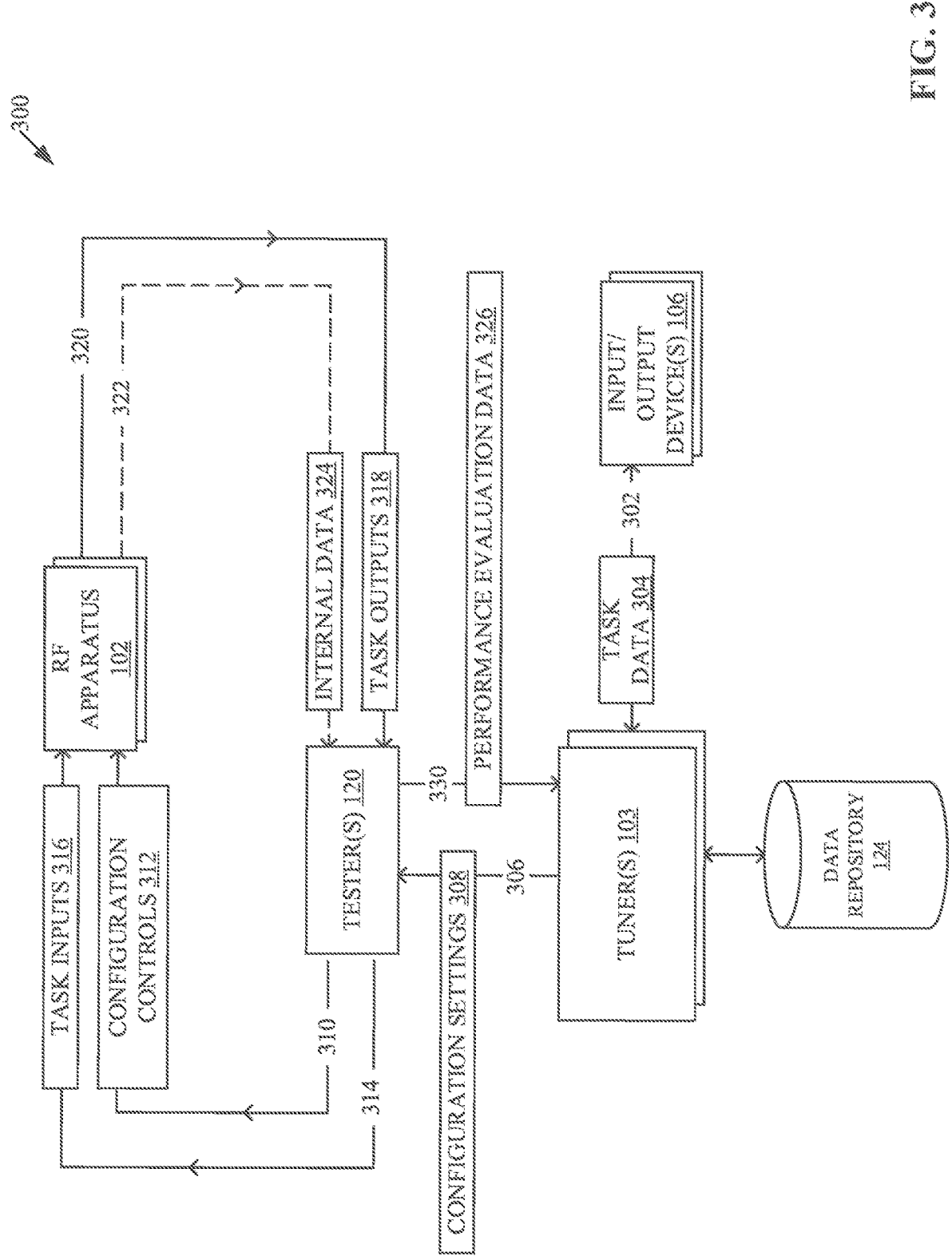
FIG. 3 illustrates a diagram of an example, non-limiting tuning operation that can be implemented by one or more apparatuses, systems, and/or computer-implemented methods to tune one or more RF apparatuses via a sequential model-based optimization ("SMBO") technique in accordance with one or more embodiments described herein.

FIG. 3 illustrates a diagram of an example, non-limiting tuning operation 300 that can be executed by the system 100 in accordance with one or more embodiments described herein. At 302, the one or more input/output devices 106 can share task data 304 with the one or more tuners 103. Additionally, or alternatively, one or more elements of the task data 304 can be shared with the one or more tuners 103 by the one or more data repositories 124. In accordance with various embodiments described herein, the task data 304 can define, for example: operational constraints of the one or more RF apparatuses 102, safety constraints associated with operation of the one or more RF apparatuses 102, optimization threshold values, operation parameters, RF apparatus 102 specification data, task objectives, tuning objectives, a combination thereof, and/or the like. For instance, the task data 304 can include, but are not limited to: attributes and/or metadata characterizing the one or more RF apparatuses 102 (e.g., RF apparatus 102 serial numbers, part numbers, and/or the like); permissible parameter ranges; associate probability distributions (e.g., delineating uniform and/or normal distributions); measurement losses targeted for optimization (e.g., to be maximized or minimized), including multiple measurement losses to be optimized; prioritizations associated with one or more objectives defined by measurement losses targeted for optimization (e.g., including a Pareto front); a combination thereof; and/or the like. Additionally, the task data 304 can include one or more external parameters that the one or more RF apparatuses 102 may be exposed to during operation (e.g., a defined temperature range and/or signal interference).

Based on the task data 304, the one or more tuners 103 can initialize a tuning operation 300 by selecting one or more machine learning models 206 for tuning the one or more RF apparatuses 102. For example, the one or more tuners 103 can utilize a machine learning engine 118 to generate and/or train a machine learning model 206 based on the task data 304 in accordance with various embodiments described herein. In another example, the one or more tuners 103 can utilize a transfer learning engine 204 to select a pre-trained machine learning model 206 based on the task data 304 in accordance with various embodiments described herein.

At 306, the one or more tuners 103 can share one or more configuration settings 308 with the one or more testers 120 in accordance with various embodiments described herein. Additionally, at 306 the one or more tuners 103 can share data comprised within the task data 304 with the one or more testers 120. In accordance with various embodiments described herein, the machine learning engine 118 can utilize the one or more machine learning models 206 to generate the one or more configuration settings 308. For example, the one or more tuners 103 can engage a first iteration of the tuning operation 300 by sending initial configuration settings 308 to the testers 120. In one or more embodiments, the one or more tuners 103 can generate the initial configuration settings 308 based on a random selection process and/or based on one or more initialization preferences defined in the task data 304. In subsequent iterations of the tuning operation 300, the one or more tuners 103 can generate configuration settings 308 using a machine learning model 206 that is updated based on previously tested configuration settings 308 and/or evaluation data. In accordance with various embodiments described herein, the configuration settings 308 can delineate how to set one or more of the variable components of the one or more RF apparatuses 102; thereby, the configuration settings 308 can modulate one or more operational parameters of the one or more RF apparatuses 102 and/or parameters characterizing one or more outputs of the RF apparatuses 102.

At 310, the one or more testers 120 can set the configuration controls 312 of the one or more RF apparatuses 102 in accordance with the last received configuration settings 308. As described herein, the configuration controls 312 can include adjustments to one or more variable components of the RF apparatus 102 to meet the configuration settings 308 for the given iteration of the tuning operation 300. Additionally, at 314, the one or more testers 120 can provide the one or more RF apparatuses 102 with one or more task inputs 316. As described herein, the one or more task inputs 316 can define one or more tasks to be executed by the one or more RF apparatuses 102 and/or can include input data to be analyzed, controlled, and/or otherwise augmented by the one or more RF apparatuses 102. In accordance with various embodiments described herein, the one or more task inputs 316 can include, for example: data to be analyzed by the one or more RF apparatuses 102 during the test operation; task objectives to be completed by the one or more RF apparatuses 102 during the test operation; modes of operation to be implemented by the one or more RF apparatuses 102 during the test operation; a combination thereof, and/or the like.

Based on the one or more task inputs 316 and/or configuration controls 312 defined by the one or more testers 120, the one or more RF apparatuses 102 can execute a test operation and generate one or more task outputs 318, such as one or more output signals. At 320, the one or more RF apparatuses 102 can share the one or more task outputs 318 with the one or more testers 120 to evaluate the performance of the one or more RF apparatuses 102 during the test operation. Optionally, at 322 the one or more testers 120 can further collect internal data 324 characterizing the internal operations of the one or more RF apparatuses 102. For instance, the internal data 324 can include one or more measurements of various components of the one or more RF apparatuses 102 during the test operation. Example measurements that can be comprised in the internal data 324 include, but are not limited to: temperature measurements (e.g., the temperature of respective RF apparatus 102 components and/or regions of the RF apparatus 102), time measurements (e.g., how long respective RF apparatus 102 components are active), vibration measurements, voltage measurements, power measurements, spectral power measurements, humidity measurements, operating hours measurements and/or tracking, a combination thereof, and/or the like.

In various embodiments, the internal data 324 can also include identification information (e.g., name, serial number, model number, a combination thereof, and/or the like) that identifies: the particular RF apparatus 102 associated with a given set of task outputs 416; and/or particular components of the RF apparatus 102. For example, where a tester 120 controls the test operations of multiple RF apparatuses 102, the internal data 324 can be utilized to correlate task outputs 318 to the respective RF apparatus 102 that generated the task outputs 318. In one or more embodiments, the one or more testers 120 can collect the internal data 324 while the test operation is being executed by the one or more RF apparatuses 102. Alternatively, the one or more testers 120 can collect the internal data 324 after completion of the one or more test operations.

In one or more embodiments, the one or more testers 120 can control multiple test operations on the one or more RF apparatuses 102 with the same configuration controls 312 and/or task inputs 316. For instance, the one or more testers 120 can control multiple runs of the test operation and collect task outputs 318 and/or internal data 324 with each run. Thus, a given iteration of the tuning operation 300 can comprise multiple executions of the same test operation (e.g., utilizing the same configuration controls 312). By executing multiple runs of the test operation, the one or more testers 120 can improve the accuracy of the performance evaluation data 326 associated with the given iteration of the tuning operation 300.

In various embodiments, the one or more testers 120 can perform one or more data processing techniques to analyze the task outputs 318 and/or internal data 324 and generate the performance evaluation data 326. Example data processing techniques that can be employed by the one or more testers 120 can include, but are not limited to: data aggregation, dataset pruning, data mining, data imputation, data standardization, data validation, data transformation, a combination thereof, and/or the like. For example, the one or more testers 120 can extract: one or more parameters of the output signal of the one or more RF apparatuses 102, and/or one or more operating parameters of the one or more RF apparatuses 102. Further, the one or more extracted parameters can constitute the performance evaluation data 326. Example parameters that the one or more testers 120 can extract from the task outputs 318 (e.g., output signals) can include, but are not limited to: rise time, rise time slope, fall time, fall time slope, pulse width, pk-pk amplitude, mean amplitude displacement from zero, phase, band flatness, in-band spectral emission, out-of-band spectral emissions, error vector magnitude, a combination thereof, and/or the like. Example operating parameters that the one or more testers 120 can extract from the task outputs 318 and/or internal data 324 can include, but are not limited to: filter coefficient, output power, a combination thereof, and/or the like.

At 330, the one or more testers 120 can share the performance evaluation data 326 with the one or more tuners 103, which can analyze the performance evaluation data 326 to determine one or more performance metrics that characterize the quality of performance achieved by the one or more RF apparatuses 102 during the first iteration of the tuning operation 300. For example, the machine learning engine 118 can compare the performance evaluation data 326 to target performance data characterizing a desired (e.g., optimal) operation of the one or more RF apparatuses 102 given the same task inputs 316. In one or more embodiments, the target performance data can be defined by the one or more input/output devices 106. For instance, the target performance data can be included in the task data 304 shared with the one or more tuners 103 at 302. In a further instance, the target performance data can be stored in the computer readable storage media 110 of the tuners 103 or retrieved from the one or more data repositories 124.

In various embodiments, the one or more tuners 103 (e.g., via machine learning engine 118) can execute a loss function algorithm, such as a correlation-based (e.g., a cross-correlation coefficient of two time series measurements from the performance evaluation data 326) and/or error-based loss function algorithm, to generate the performance metric (e.g., a loss value) based on the performance evaluation data 326 and the target performance data. Example loss function algorithms that can be executed by the one or more tuners 103 (e.g., via machine learning engine 118) to determine the performance metric 328 can include, but are not limited to: a mean square error loss algorithm, a mean absolute error loss algorithm, a Huber loss algorithm, a log-cos h loss algorithm, a quantile loss algorithm, a combination thereof, and/or the like.

In one or more embodiments, the one or more one or more tuners 103 (e.g., via machine learning engine 118) can compare the performance metric to one or more optimization thresholds to determine whether the one or more RF apparatuses 102 are sufficiently tuned by the configuration settings 308 used in the given iteration of the tuning operation 300. For instance, where the performance metric is a loss value, the one or more tuners 103 can determine that an RF apparatus 102 is sufficiently tuned (e.g., performing to a desired optimization level) when the performance metric is less than a defined loss value (e.g., thereby indicating a desired amount of similarity between the performance evaluation data 326 and the target performance data). In one or more embodiments, the bounds of the optimization threshold can defined by the one or more input/output devices 106. For instance, the optimization threshold (e.g., maximum loss value) can be included in the task data 304 shared with the one or more tuners 103 at 302. In a further instance, the optimization threshold can be stored in the computer readable storage media 110 of the tuners 103 or retrieved from the one or more data repositories 124.

In some embodiments, the tuning operation 300 can repeat features 306-330 within a time budget (e.g., defined by the task data 304), where the tuning operation 300 can comprise the maximum number of iterations that can be performed within the constraints of the time budget; thereby generating a pool of test configuration settings 308 from which the optimal configuration setting 308 can be chosen. In one or more embodiments, the tuning operation 300 can repeat features 306-330 until the resulting performance evaluation data 326 meets at least the minimum optimization standards defined by the one or more optimization thresholds or until the time budget is exhausted (e.g., whichever event occurs first).

For example, where the one or more tuners 103 determine that the one or more RF apparatuses 102 are sufficiently tuned, the tuning operation 300 can end. Further, the one or more tuners 103 can utilize the performance evaluation data 326 and/or performance metric 328 to train and/or initialize one or more machine learning models 206 for future tuning operations 300. Where the one or more tuners 103 determine that the one or more RF apparatuses 102 need additional tuning (e.g., the test configuration settings 308 did not result in an optimal performance), the one or more tuners 103 can update the one or more machine learning models 206 based on the performance evaluation data 326 and/or performance metric 328 and generate one or more new configuration settings 308 for a subsequent iteration of the tuning operation 300. For example, the subsequent iteration of the tuning operation 300 can repeat features 306-330 utilizing the newly generated configuration settings 308. Thus, the tuning operation 300 can comprise multiple iterations; however, the one or more machine learning engines 118 of the tuners 103 can implement one or more Gaussian processing and/or Bayesian optimization techniques to minimize the number of iterations.

Figure 4:
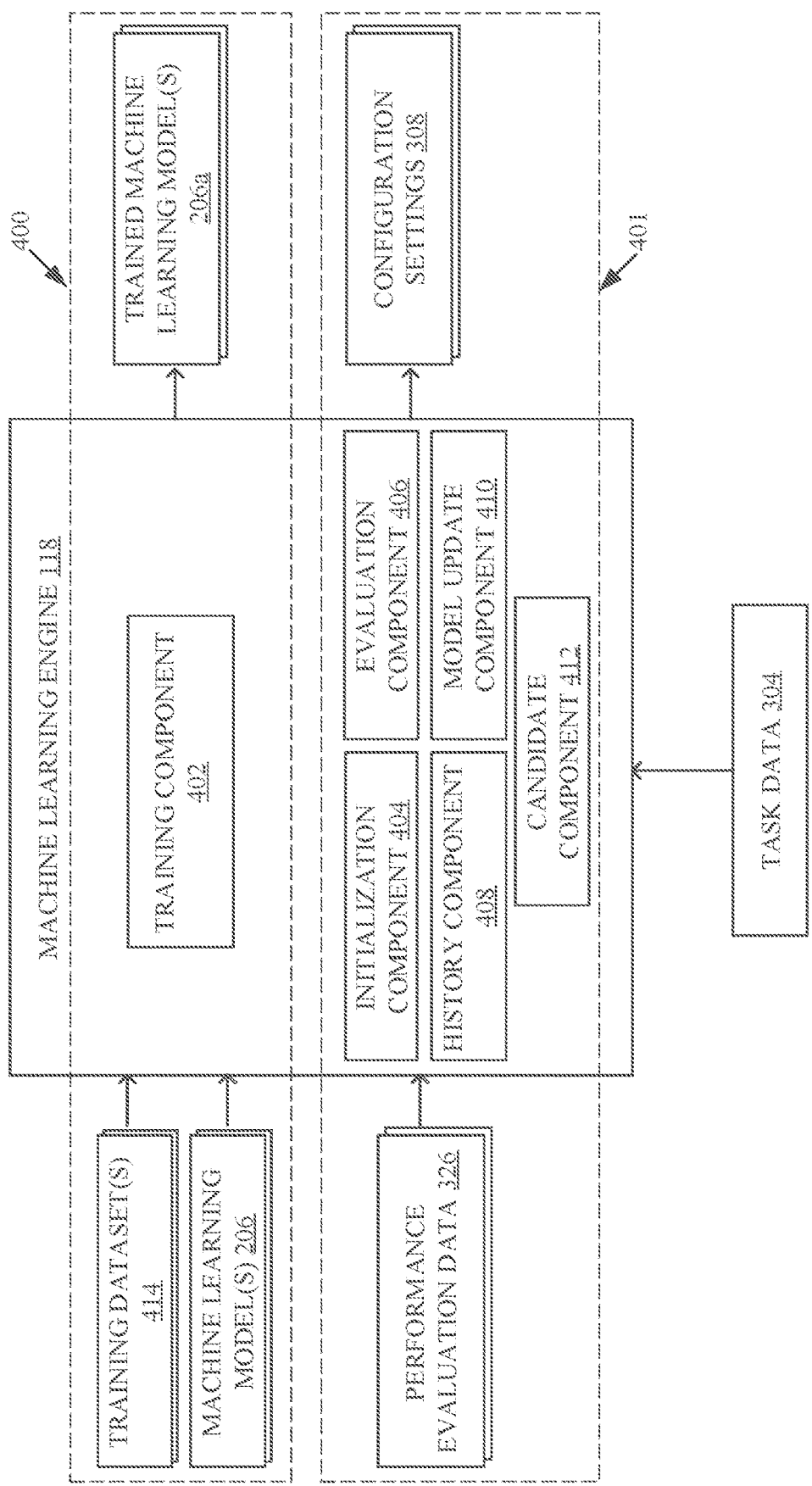
FIG. 4 illustrates a diagram of an example, non-limiting machine learning engine that can execute a Bayesian optimization algorithm to determine test configuration settings for tuning one or more RF apparatuses in accordance with one or more embodiments described herein.

FIG. 4 illustrates a diagram of an example, non-limiting embodiment of the machine learning engine 118 further comprising training component 402, initialization component 404, evaluation component 406, history component 408, model update component 410, and/or candidate component 412. In various embodiments, the associate components of the machine learning engine 118 can be computer executable components 114 stored in the or more computer readable storage media 110 of the one or more tuners 103, or stored elsewhere in the system 100 and remotely accessed by the machine learning engine 118. As shown in FIG. 4, the machine learning engine 118 can execute a training stage 400 for training and/or fitting one or more machine learning models 206 and/or an inference stage 401 for identifying configuration settings 308 to be tested in one or more iterations of a tuning operation (e.g., example tuning operation 300). In various embodiments, the machine learning engine 118 can execute a Bayesian optimization algorithm to perform one or more iterations of the training stage 400 (e.g., comprising fitting the machine learning models 206 to training datasets 414 and/or performance evaluation data 326) and the inference stage 401 (e.g., where the machine learning engine 118 is configured to, based on the machine learning model 206, search the parameter space for new configuration settings 308 to investigate based on, for example, expected performance improvement).

During the training stage 400, the training component 402 can train the one or more machine learning models 206 on one or more training datasets 414. The one or more training datasets 414 can be stored in the computer readable storage media 110. Alternatively, the one or more training datasets 414 can be stored off the one or more tuners 103 and remotely accessed by the training component 402. For example, the training component 402 can retrieve the one or more training datasets 414 from the one or more input/output devices 106 and/or data repositories 124. In various embodiments, the one or more training datasets 414 can include historic data regarding, but not limited to: RF apparatus 102 performance data (e.g., including performance evaluation data 326 from previous, and/or other, tuning operations); previous operations of the one or more RF apparatuses 102; and/or previous determinations by the one or more tuners 103. In one or more embodiments, the one or more training datasets 414 can also include synthetic data relating to RF apparatus 102 performance, such as, data obtained from EM modeling software. Examples of EM modeling software tools that can provide RF apparatus 102 performance parameters are a SONNET SUITES tool available from Sonnet Software, Inc. and ANSYS HFSS design tool available from Ansys, Inc. Additionally, the one or more training datasets 414 can include labelled and non-labelled data.

In various embodiments, the training component 402 can execute supervised learning, unsupervised learning, and/or reinforcement learning techniques to train the one or more machine learning models 206 on the training datasets 414 and/or performance evaluation data 326 (e.g., thereby generating one or more trained machine learning models 206a), which can be utilized by the machine learning engine 118 to execute one or more tuning operations described herein. For example, the training stage 400 can involve changing weights associated with nodes in layers of the one or more machine learning models 206 over multiple iterations until an expected output is obtained for particular training input data from the training dataset 414. One or more learning algorithms can be used to train layers of the one or more machine learning models 206. For example, a gradient descent algorithm and backpropagation algorithm can be used in tandem when the one or more machine learning models 206 are deep multi-layer ANN models. In various embodiments, supervised and/or unsupervised learning can be used to change weights to minimize a loss function. Reinforcement learning can be used to change weights to maximize a reward function. In further examples, activation functions, such as a sigmoid function, may also be used especially after layers with weights. Data fitting or regularization techniques to achieve a balanced ANN model and avoid undesired overfitting or underfitting can also be used. Additionally, further optimizations may be employed to improve training, such as, expanding the training dataset 414 with augmentation, increasing training time or the depth (or width) of the machine learning model 206, adding regularization, or increasing hyperparameter tuning as would be apparent to person skilled in the art given this description.

During the inference stage 401, the machine learning engine 118 can utilize the one or more machine learning models 206 (e.g., trained machine learning models 206a) to execute a Bayesian optimization algorithm to identify configuration settings 308 to be tested and/or evaluated during the tuning operation. In various embodiments, the initialization component 404 can initialize the Bayesian optimization by selecting one or more initial configuration settings 308 from a permissible range, which can be defined by the task data 304 and/or by historic data (e.g., stored in the one or more data repositories 124). For instance, the initialization component 404 can randomly choose the initial configuration settings 308. In another instance, the initialization component 404 can choose the initial configuration settings 308 based on one or more past tuning operations performed on the one or more RF apparatuses 102. In a further instance, the initialization component 404 can choose the initial configuration settings 308 based on one or more tuning operations performed on other RF apparatuses 102. In a still further instance, the initialization component 404 can employ a pre-trained transfer learning model to choose the one or more initial configuration settings 308.

In accordance with various embodiments described herein, the one or more testers 120 can execute one or more test operations on the one or more RF apparatuses 102 in accordance with the initial configuration settings 308 to generate performance evaluation data 326. The evaluation component 406 can compare the performance evaluation data 326 to the predicted performance data (e.g., target performance data) via a cost or loss function algorithm to generate the performance metric. Further, the history component 408 can store the performance evaluation data 326, performance metric, and/or one or more associate model hyperparameters in a historic data log. For example, the history component 408 can update the training dataset 414 with the performance evaluation data 326, performance metric, and/or one or more associate model hyperparameters. In another example, the history component 408 can store the historic data log in the one or more data repositories 124.

Where the performance metric is outside the bounds of one or more defined optimization thresholds (e.g., defined via the task data 304), the model update component 410 can update the machine learning model 206 (e.g., which can be surrogate model, such as a GP model or a Random Forest model, that provides a probabilistic representation of the relationship between configuration settings 308 and RF apparatus 102 performance in accordance with various embodiments described herein). For example, the model update component 410 can fit the machine learning model 206 to the historic data log. For instance, the model update component 410 can tune one or more hyperparameters of the machine learning model 206 based on the historic data log (e.g., the results associated with tested configuration settings 308 from the previous model configuration). Thereby, the updated machine learning model 206 can predict the RF apparatus 102 performance associated with potential configuration settings 308 with greater accuracy than previously exhibited.

Subsequently, the candidate component 412 can apply one or more acquisition functions to the updated machine learning model 206 and select a new configuration setting 308 for testing. In various embodiments, the one or more acquisition functions can analyze the possible configuration settings 308 represented by the parameter space along with the associate probability values. For instance, the candidate component 412 can apply an expected improvement acquisition function to identify one or more configuration settings 308 predicted to provide the maximum improvement to performance based on the newly fitted machine learning model 206. In one or more embodiments, the candidate component 412 can execute one or more acquisition functions that balance between exploration and exploitation objectives (e.g., which can be defined in the task data 304). The configuration settings 308 identified by the candidate component 412 can then be tested by the one or more testers 120 and further performance evaluation data 326 can be analyzed by the machine learning engine 118. In one or more embodiments, the machine learning engine 118 can repeat the features of the training stage 400 and/or inference stage 401a minimum number of times to achieve a performance metric that meets the bounds of the defined optimization threshold. In one or more embodiments, the machine learning engine 118 can repeat the features of the training stage 400 and/or the inference stage 401 as many times that is capable within a defined time budget (e.g., where at the end of the time budget the tested configuration setting 308 associated with the best performance metric can be used to tune the one or more RF apparatuses 102).

Figure 5:
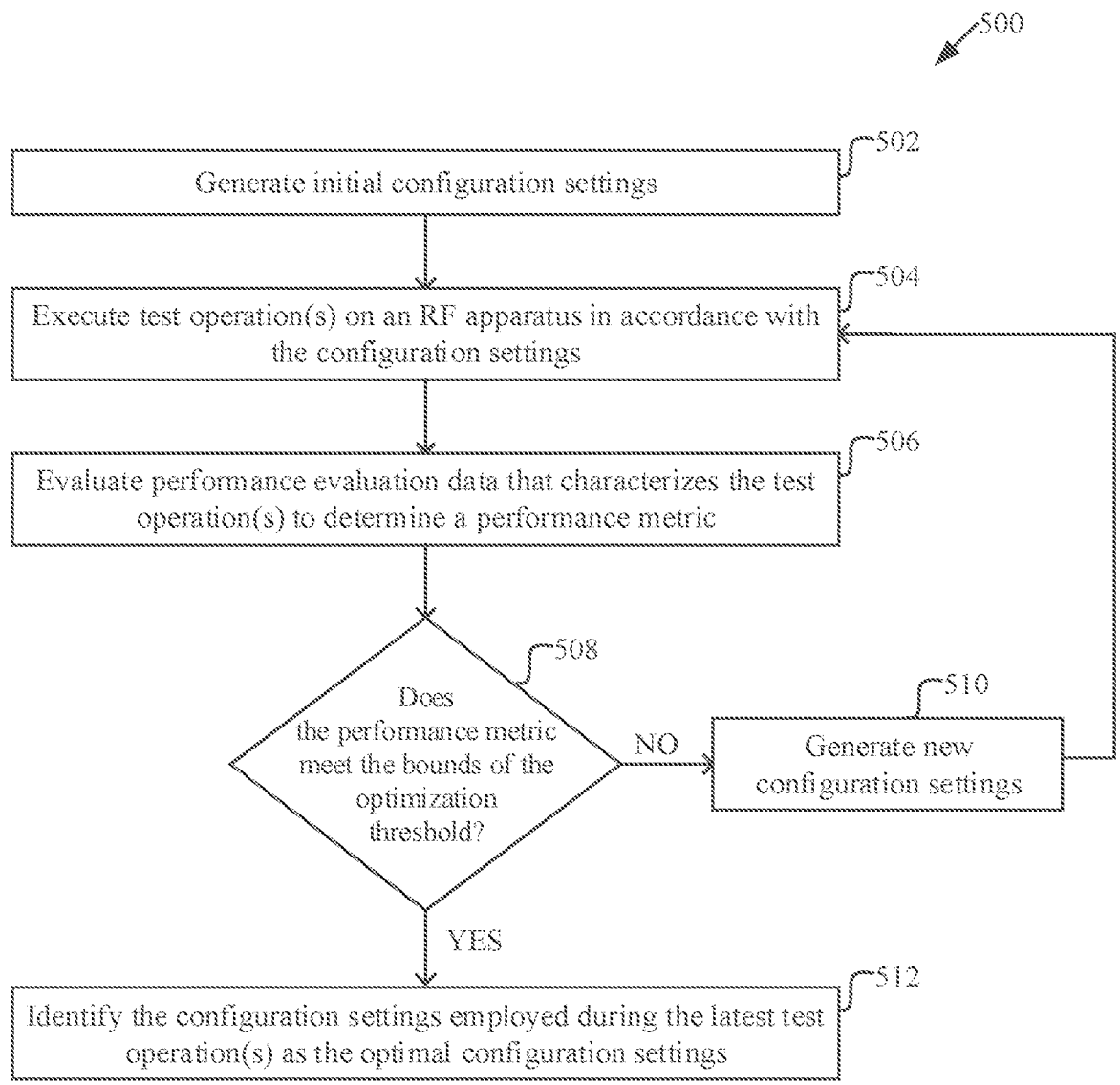
FIGS. 5-6 illustrate flow diagrams of example, non-limiting computer-implemented methods that can be implemented by one or more apparatuses and/or systems to tune one or more RF apparatuses in accordance with one or more embodiments described herein.

FIG. 5 illustrates a flow diagram of an example, non-limiting computer-implemented method 500 that can be implemented by the system 100 in accordance with one or more embodiments described herein to tune one or more RF apparatuses 102 for optimal performance.

At 502, the computer-implemented method 500 can comprise generating one or more initial configuration settings 308. For example, the machine learning engine 118 can randomly select the initial configuration settings 308 from the combinatorial parameter space of a machine learning model 206. At 504, the computer-implemented method 500 can comprise executing one or more test operations on one or more RF apparatuses 102 in accordance with the configuration settings 308 (e.g., in accordance with the initial configuration settings 308). For example, the one or more testers 120 can set one or more configuration controls 312 to adjust one or more variable components of the RF apparatus 102 and meet provided the configuration settings 308. Additionally, the one or more testers 120 can control operation of the RF apparatus 102 in accordance with one or more operational and/or safety constraints (e.g., which can be defined via the task data 304 and implemented via the one or more task inputs 316).

As a result of the test operations, performance evaluation data 326 can be collected by the one or more testers 120, where the performance evaluation data 326 can characterize the one or more test operations performed at 504 in accordance with various embodiments described herein. At 506, the computer-implemented method 500 can comprise evaluating the performance evaluation data 326 to determine a performance metric. For example, the one or more testers 120 can execute one or more loss function algorithms to compare the performance evaluation data 326 to target performance data, where the performance metric can be can be the loss value.

At 508, the computer-implemented method 500 can comprise determining whether the performance metric meets the bounds of an optimization threshold (e.g., defined via the one or more input/output devices 106 and/or included in the task data 304). For example, the one or more tuners 103 can compare the performance metric to one or more defined threshold values (e.g., defined loss value ranges).

In response to determining that the performance metric is outside the bounds of the optimization threshold, the computer-implemented method 500 can proceed to 510, where one or more new configuration settings 308 can be generated. For example, the machine learning engine 118 can update the one or more machine learning models 206 based on the performance evaluation data 326 and choose one or more new configuration settings 308 that are predicted to render the maximum expected improvement. For instance, at 510 the machine learning engine 118 can tune one or more hyperparameters of the machine learning model 206 based on the performance evaluation data 326 and/or performance metric. Further, at 510 the machine learning engine can apply one or more acquisition functions to the tuned machine learning model 206 to generate new configuration settings 308 for testing. Additionally, the machine learning engine 118 can consider one or more confidence values associated with the potential configuration settings 308 in selecting the new configuration settings 308 at 510. Subsequently, the computer-implemented method 500 can repeat features 504-508 to analyze the effects of the new configuration settings 308 on the performance of the one or more RF apparatuses 102.

In response to determining that the performance metric is within the bounds of the optimization threshold, the computer-implemented method 500 can proceed to 512, where the configuration settings 308 employed during the latest test operation can be identified as the optimal configuration settings 308 for the one or more RF apparatuses 102. For example, the bound of the optimization threshold can be less than or equal to a defined loss value, where the one or more tuners 103 can determine that the one or more RF apparatuses 102 are sufficiently tuned when the performance metric is less than or equal to the defined loss value.

Figure 6:
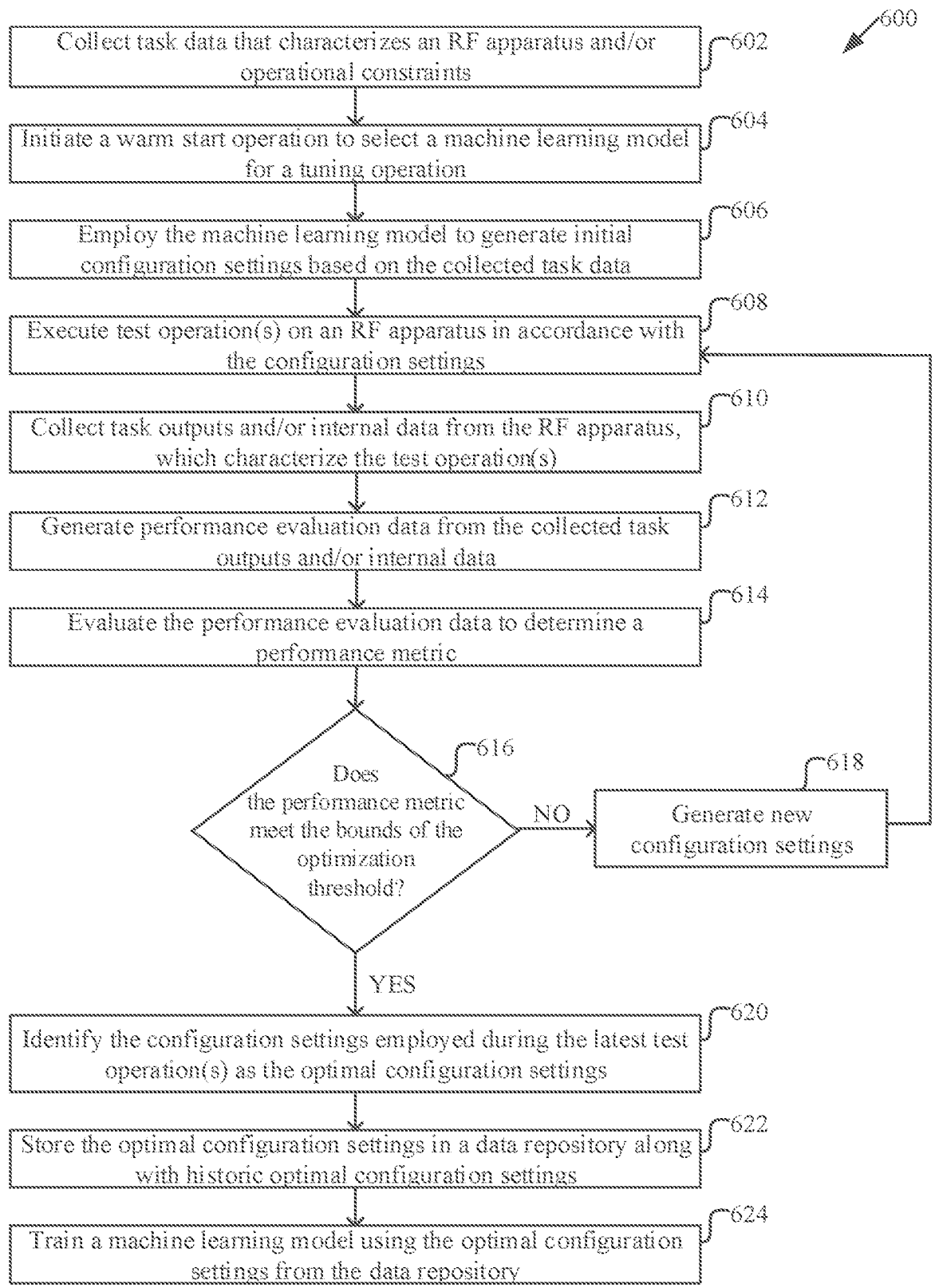

FIG. 6 illustrates a flow diagram of another example, non-limiting computer-implemented method 600 that can be implemented by the system 100 in accordance with one or more embodiments described herein. At 602, the computer-implemented method 600 can comprise collecting task data 304 that can characterize one or more RF apparatuses 102 and/or operational constraints. For instance, the task data 304 can be entered into the system 100 via the one or more input/output devices 106 and received by the one or more tuners 103, as exemplified by tuning operation 300. The task data 304 collected at 602 can include information identifying the particular RF apparatus 102 subject to tuning and/or the location of the RF apparatus 102 within one or more networks 104 (e.g., within a communications and/or data network, such as a satellite communications network). For instance, the task data 304 collected at 602 can include a model number, serial number, IP address, and/or network address of the one or more RF apparatuses 102. In one or more embodiments, the one or more tuners 103 can retrieve further data regarding the operating specifications of the one or more RF apparatuses 102 from one or more data repositories 124 based on the identity information provided in the task data 304. For example, the operating specifications can delineate the type and/or number of variable components included in the one or more RF apparatuses 102 and/or the type and/or number of parameters that can be controlled by the variable components.

Additionally, the task data 304 can include operational constraints of the one or more RF apparatuses 102, such as permissible and/or impermissible parameter ranges. In various embodiments, the one or more tuners 103 can utilize the operational constraints to ensure that generated configuration settings 308 result in safe operation of the one or more RF apparatuses 102. For example, configuration settings 308 predicted to result in task outputs 318 and/or internal data 324 that are outside the defined operational constraints can be removed from the candidate pool of potential test configuration settings 308. For instance, the one or more operational constraints can delineate a maximum peak power value, where the one or more tuners 103 can exclude potential configuration settings 308 that are predicted to result in a peak power value that exceeds the maximum peak power value. In various embodiments, the one or more operational constraints can be defined to protect the safety of one or more users and/or of the integrity of the RF apparatuses 102.

In accordance with various embodiments described herein, the task data 304 collected at 602 can further characterize one or more test operations to be performed by the one or more tuners 103, define one or more optimization objectives used to tune the one or more RF apparatuses 102 (e.g., the type of optimization and/or evaluation algorithm, such as the type of loss function algorithm), define one or more optimization thresholds, define one or more computational cost budgets (e.g., a time budget), a combination thereof, and/or the like.

At 604, the computer-implemented method 600 can optionally initiate (e.g., via machine learning engine 118) a warm start operation to select a machine learning model 206 for a tuning operation (e.g., in accordance with example tuning operation 300). The warm start operation can comprise, for example, a transfer learning algorithm (e.g., executed via the transfer learning engine 204 in accordance with various embodiments described herein) that selects a transfer learning model to facilitate the tuning operation. For example, the transfer learning model can be a machine learning model 206 that was previously trained on one or more other machine learning tasks. For instance, the transfer learning model can be a machine learning model 206 previously trained on a tuning operation for one or more other RF apparatuses 102 of the same type and/or model of the RF apparatus 102 currently subject to tuning (e.g., trained on tuning operations for RF apparatuses 102 of the same product line). In another instance, the transfer learning model can be a machine learning model 206 previously trained on a tuning operation for one or more other RF apparatuses 102 that share one or more manufacturing similarities with the RF apparatus 102 currently subject to tuning. In a further instance, the transfer learning model can be a machine learning model 206 previously trained on a tuning operation for one or more other RF apparatuses 102 having one or more of the same variable components as the RF apparatus 102 currently subject to tuning. By employing the warm start operation, when a new RF apparatus 102 (e.g., an RF apparatus 102 of a newly developed product line) is subject to tuning, the knowledge gained (e.g., lessons learned) from previous tuning operations of similar RF apparatuses 102 can be utilized to initialize the subject tuning operation (e.g., can be utilized to tailor the combinatorial parameter space) and/or improve the selection of configuration settings 308 (e.g., the gained knowledge can improve the accuracy of expected improvement determinations).

At 606, the computer-implemented method 600 can comprise employing (e.g., via machine learning engine 118) the one or more selected machine learning models 206 to generate one or more initial configuration settings 308 based on the collected task data 304. For example, the machine learning engine 118 can select (e.g., through a randomized operation) the one or more initial configuration settings 308 based on one or more permissible ranges defined by the task data 304. At 608, the computer-implemented method 600 can comprise executing (e.g., via testers 120) one or more test operations on the one or more RF apparatuses 102 in accordance with the configuration settings 308. For example, the one or more testers 120 can control one or more task inputs 316 and/or configuration controls 312 in accordance with various embodiments described herein.

At 610, the computer-implemented method 600 can comprise collecting (e.g., via testers 120) one or more task outputs 318 and/or internal data 324 from the one or more RF apparatus 102, which characterize the one or more test operations performed at 608. For example, the one or more task outputs 318 can include one or more output signals generated by the one or more RF apparatuses 102 during the test operations, and/or the internal data 324 can include operation measurements of one or more components of the one or more RF apparatuses. At 612, the computer-implemented method 600 can comprise generating (e.g., via testers 120) performance evaluation data 326 from the collected task outputs 318 and/or internal data 324. For example, the one or more testers 120 can extract one or more parameters characterizing the features of one or more output signals generated by the one or more RF apparatuses 102 in accordance with various embodiments described herein. In another example, the one or more testers 120 can extract one or more operational parameters characterizing the operating conditions exhibited by one or more components of the one or more RF apparatuses in accordance with various embodiments described herein.

At 614, the computer-implemented method 600 can comprise evaluating (e.g., via machine learning engine 118) the performance evaluation data 326 to determine a performance metric. For example, the machine learning engine 118 can evaluate the performance evaluation data 326 in accordance with one or more optimization objectives defined by the task data 304. For instance, the machine learning engine 118 can execute one or more loss functions to compare the performance evaluation data 326 to a target performance in accordance with various embodiments described herein.

At 616, the computer-implemented method 600 can comprise determining whether the performance metric meets the bounds of an optimization threshold (e.g., defined via the one or more input/output devices 106 and/or included in the task data 304). For example, the one or more tuners 103 can compare the performance metric to one or more defined threshold values (e.g., defined loss value ranges).

In response to determining that the performance metric is outside the bounds of the optimization threshold, the computer-implemented method 600 can proceed to 618, where one or more new configuration settings 308 can be generated. For example, the machine learning engine 118 can update the one or more machine learning models 206 based on the performance evaluation data 326 and choose one or more new configuration settings 308 that are predicted to render the maximum expected improvement. Additionally, the machine learning engine 118 can consider one or more confidence values associated with the potential configuration settings 308 in selecting the new configuration settings 308 at 618. Subsequently, the computer-implemented method 600 can repeat features 608-616 to analyze the effects of the new configuration settings 308 on the performance of the one or more RF apparatuses 102.

In response to determining that the performance metric is within the bounds of the optimization threshold, the computer-implemented method 600 can proceed to 620, where the configuration settings 308 employed during the latest test operation can be identified as the optimal configuration settings 308 for the one or more RF apparatuses 102. At 622, the computer-implemented method 600 can comprise storing the one or more optimal configuration settings 308 in the one or more data repositories 124 along with historic optimal configuration settings 308 (e.g., retrieved from other tuning operations). At 624, the computer-implemented method 600 can comprise training one or more machine learning models 206 using the optimal configuration settings 308 from the one or more data repositories 124.

Figure 7A:
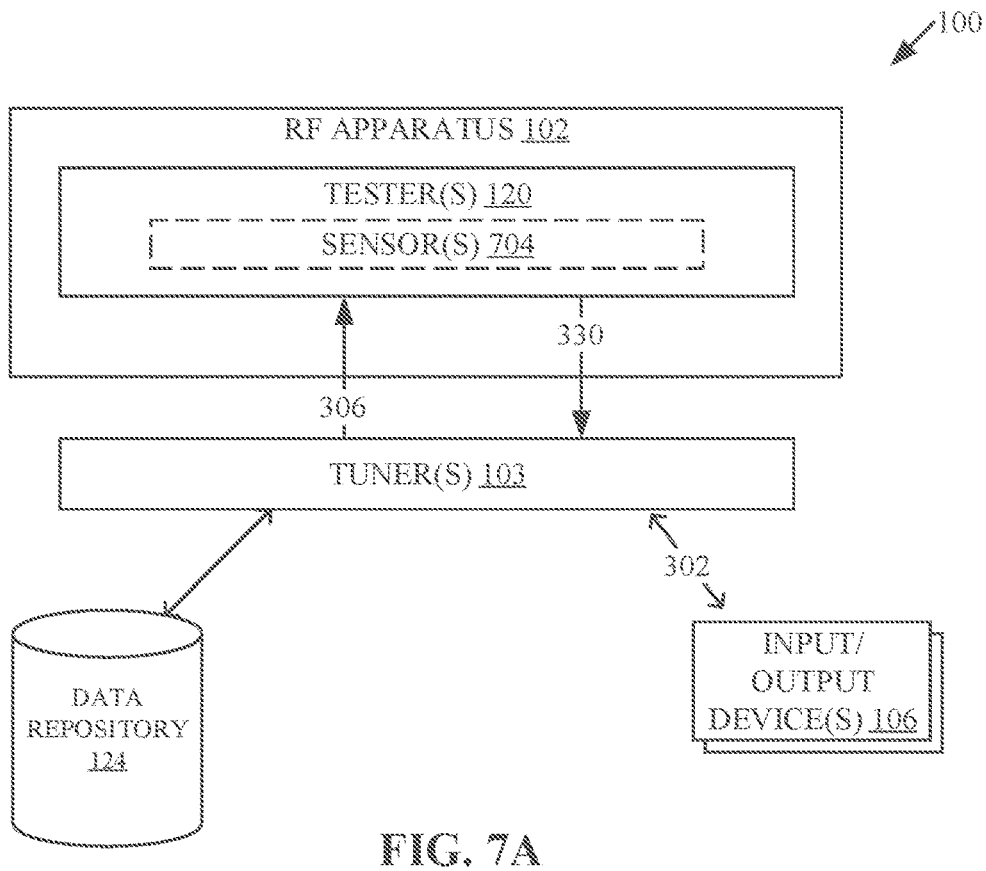
FIGS. 7A-7B illustrate diagrams of example, non-limiting RF apparatuses that can comprise one or more on-board and/or remote testers and/or tuners to facilitate one or more tuning operations to optimize performance in accordance with one or more embodiments described herein.
Figure 7B:
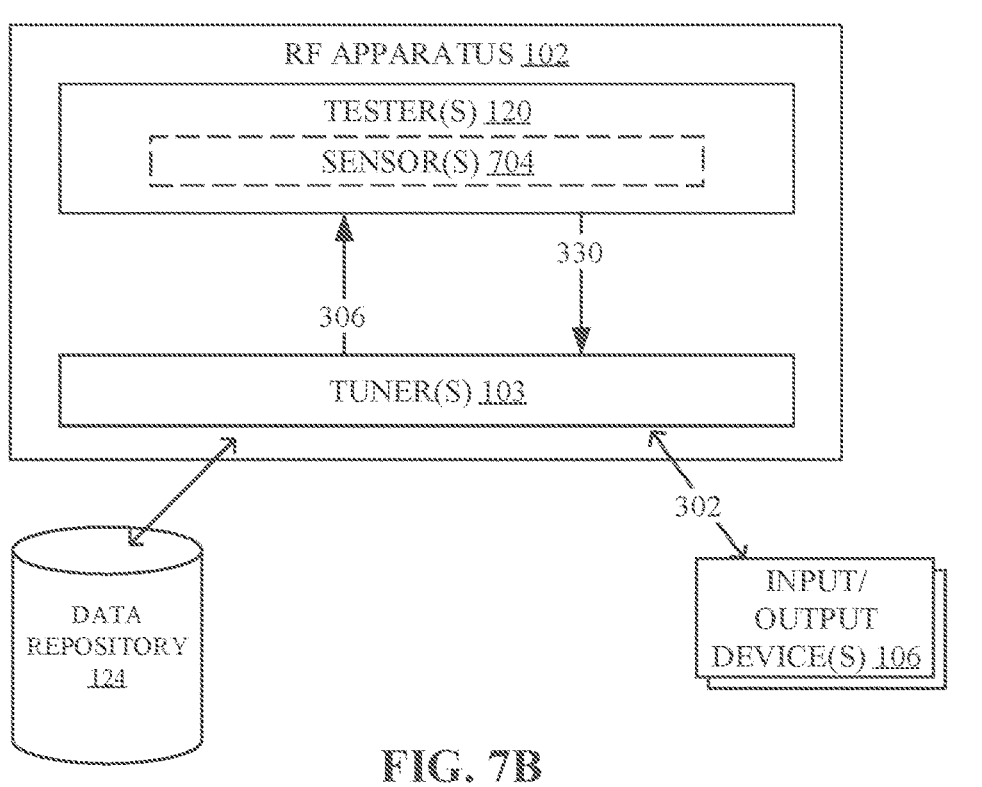

FIGS. 7A-7B illustrate diagrams of the example, non-limiting system 100 in which the one or more testers 120 and/or tuners 103 can be comprised within the one or more RF apparatuses 102 (e.g., rather than accessing the one or more RF apparatuses 102 remotely) in accordance with one or more embodiments described herein. For example, FIGS. 7A-B depicts example embodiments in which the one or more RF apparatuses 102 further comprise the one or more testers 120, which can then communicate with the one or more tuners 103 (e.g., via a wireless connection across the one or more networks 104, such as a cloud computing environment). For instance, the one or more testers 120 can be computer executable components 114 embedded and/or otherwise stored on the one or more RF apparatuses 102. Additionally, the one or more testers 120 can further comprise, and/or be operably coupled to, one or more sensors 704 that can measure and/or collect the one or more task outputs 318 and/or internal data 324.

In the example embodiment shown in FIG. 7A, the one or more on-board testers 120 can communicate, and/or share data, with the one or more remote tuners 103 via the one or more networks 104 in accordance with the various embodiments described herein. In the example embodiment shown in FIG. 7B, the one or more RF apparatuses 102 can also comprise one or more on-board tuners 103, which can communicate, and/or share data, with the one or more testers 120 via, for example, a direct electrical connection and/or local wireless connection (e.g., via the one or more networks 104). In one or more embodiments, the on-board tuner 103 can comprise the machine learning engine 118, transfer learning engine 204, and/or machine learning models 206. In some embodiments, the on-board tuner 103 can comprise the machine learning engine 118 and/or the transfer learning engine 204, while one or more of the machine learning models 206 can be remotely accessed from the one or more data repositories 124.

Figure 8:
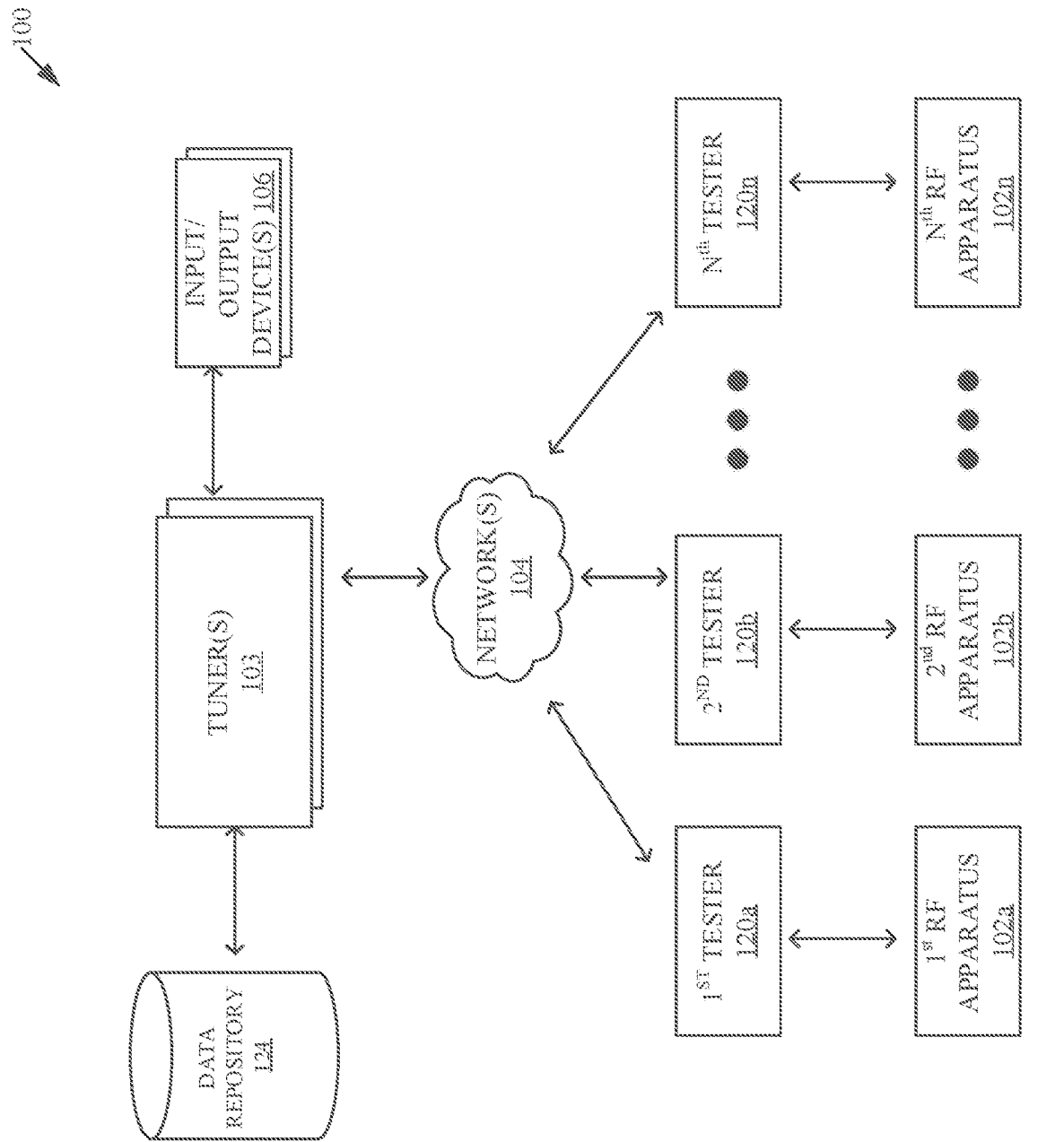
FIG. 8 illustrates a diagram of the example, non-limiting system in which multiple concurrent tuning operations can be performed based on each other in accordance with one or more embodiments described herein.

FIG. 8 illustrates a diagram of the example, non-limiting system 100 in which multiple RF apparatuses 102 can be tuned by the one or more tuners 103 (e.g., tuned simultaneously, concurrently, and/or sequentially) in accordance with one or more embodiments described herein. As shown in FIG. 8, the system 100 can comprise multiple RF apparatuses 102 (e.g., a first RF apparatus 102*a*, a second RF apparatus 102*b*, and/or one or more other RF apparatuses 102*n*). Each of the RF apparatuses 102 can be operated by a respective tester 120 (e.g., a first tester 120*a*, a second tester 120*b*, and/or one or more other testers 120*n*), which can be on-board testers 120 or remote testers 120. Alternatively, a single tester 120 can operate multiple RF apparatuses 102. Additionally, the one or more testers 120 can communicate with one or more tuners 103. For example, multiple testers 120 can communicate with a common tuner 103 via the one or more networks 104 (e.g., via a cloud computing environment). For example, a single tuner 103 can be tasked with performing tuning operations on a group of RF apparatuses 102.

In various embodiments, the common tuner 103 can perform one or more tuning operations (e.g., exemplified by tuning operation 300) on the various RF apparatuses 102 simultaneously, concurrently, and/or sequentially. Additionally, the tuner 103 can perform the tuning operation for the second RF apparatus 102*b* based on, for example, the tuning operation for the first RF apparatus 102*a* and/or the other RF apparatuses 102*n*. For instance, an optimal configuration setting 308 identified for the first RF apparatus 102*a* can serve as the initial configuration setting 308 for the second RF apparatus 102*b*. In another instance, test configuration settings 308 employed in test operations on the first RF apparatus 102*a* can be avoided in selecting the initial configuration settings 308 for the second RF apparatus 102*b*. In a further instance, the performance evaluation data 326 characterizing test operations on the first RF apparatus 102*a* can be used to update and/or fit a machine learning model 206 employed to tune the second RF apparatus 102*b* and/or the other RF apparatuses 102*n*. Additionally, the tuner 103 can utilize task data 304 regarding the first RF apparatus 102*a* to replace missing information in the task data 304 regarding the second RF apparatus 102*b* and/or other RF apparatuses 102*n*.

Figure 9:
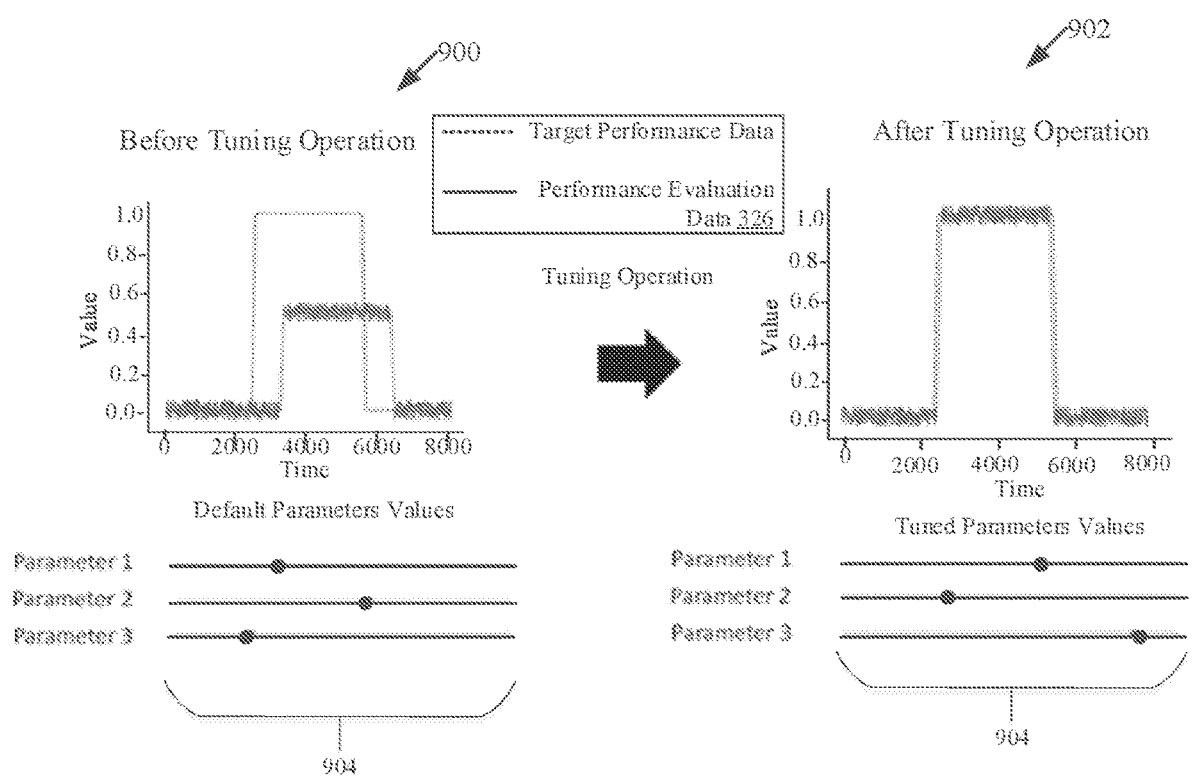
FIG. 9 illustrates a diagram of example, non-limiting graphs demonstrating the efficacy of one or more autonomous tuning operations in optimizing the performance of an RF apparatus in accordance with one or more embodiments described herein.

FIG. 9 illustrates a diagram of example, non-limiting graphs 900, 902 that can characterize one or more tuning operations that can be implemented by the system 100 during a first example use case in accordance with one or more embodiments described herein. In the first example use case, an RF apparatus 102 (e.g., an RF amplifier) can be optimized for use in a time-divisional multiple access ("TDMA") digital communication network. Wireless network protocols can require participating RF apparatuses 102 to transmit and/or receive wireless signals according to standardized performance specifications.

Due to cost complexity and/or manufacturing variations, the RF apparatus 102 may fail to meet the standardized specifications after initial assembly. For example, the RF apparatus's 102 performance after initial assembly can be distorted as a result of intrinsic material performance variation over frequency as well as variations resulting from component fabrication and/or assembly processes. To account for the variations, the RF apparatus 102 can include a front-end system with adjustable configuration controls that can be tuned (e.g., via the one or more tuners 103) to result in a performance that meets network specifications across multiple frequencies, configurations, and/or operating conditions (e.g., temperature ranges).

For example, the RF apparatus 102 (e.g., an RF amplifier) can be designed with variable gain, which is controlled by adjusting a transistor's bias level. The bias level input can be given a pre-distorted pulse shape generated by one or more variable components (e.g., an FPGA or microcontroller). Parameters that define the pre-distorted pulse shape can be modulated via one or more configuration settings 308 determined by the tuners 103. Thus, the tuning operation performed by the one or more tuners 103 can determine control signal configuration settings 308 (e.g., rise time slope, fall time slope, pulse width, pk-pk amplitude, mean amplitude displacement from zero ("DC offset"), and/or the like) such that an output signal of the RF apparatus 102 meets the standardized specifications of the TDMA digital communication network. For example, the output signal can be characterized by performance evaluation data 326 that includes amplitude variation, rise time, fall time, pulse width, output power, in-band spectral emissions, out-of-band spectral emissions, error vector magnitude, a combination thereof, and/or the like. In accordance with various embodiments described herein, the one or more tuners 103 can perform one or more tuning operations (e.g., comprising one or more iterations) via a sequential model-based Bayesian optimization algorithm to tune the configuration settings 308, where the machine learning engine 118 can utilize various single or multiple loss functions (e.g., cross-correlation and/or mean absolute error algorithms) between target performance data and collected performance evaluation data 326.

For instance, graph 900 depicts performance evaluation data 326 exhibited by the RF apparatus 102 prior to a tuning operation performed by the one or more tuners 103. As shown in FIG. 9, the performance evaluation data 326 can characterize parameters 1, 2, and 3; having values that are adjustable along the associate range 904. Graph 902 depicts the performance evaluation data 326 exhibited by the RF apparatus 102 subsequent to the tuning operation performed by the one or more tuners 103. As shown in graph 902, the tuning operation can optimize the performance of the RF apparatus 102 to generate an output signal that is characteristic of target (e.g., ideal) performance data.

ADDITIONAL EMBODIMENTS

The present disclosure is also directed to the following exemplary embodiments:

Embodiment 1: A system, comprising: a radio frequency apparatus configured to operate based on a plurality of possible configuration settings to generate an output signal that is characterized by a performance metric; and a tuner that employs a machine learning engine having a training stage and an inference stage, where the inference stage is configured to, based on a machine learning model, search the possible configuration settings for a target configuration setting that results in the performance metric meeting defined bounds of an optimization threshold value.

Embodiment 2: The system of embodiment 1, further comprising: a tester that controls operation of the radio frequency apparatus based on a plurality of test configuration settings identified by the tuner, wherein the target configuration setting is from the plurality of test configuration settings.

Embodiment 3: The system of any of embodiments 1 and/or 2, where the radio frequency apparatus is an amplifier, filter, digital signal processor, radio frequency integrated circuit, micro-electro-mechanical system filter, and/or monolithic microwave integrated circuit.

Embodiment 4: The system of any of embodiments 1-3, where the plurality of test configuration settings modulate at least one parameter of the output signal or operating parameter of the radio frequency apparatus.

Embodiment 5: The system of embodiment 4, where the at least one parameter of the output signal includes: amplitude variation, rise time, fall time, pulse width, output power, in-band spectral emissions, out-of-band spectral emissions, error vector magnitude, and/or a combination thereof.

Embodiment 6: The system of embodiment 4, where the at least one operating parameter of the radio frequency apparatus includes: filter coefficient, output power, and/or a combination thereof.

Embodiment 7: The system of any of embodiments 1-4, where the performance metric is a function of performance evaluation data that characterizes the output signal or the operating parameter of the radio frequency apparatus.

Embodiment 8: The system of embodiment 7, where the tuner determines the performance metric by comparing the performance evaluation data to a target performance dataset.

Embodiment 9: The system of any of embodiments 7 and/or 8, where the tester determines the performance metric by executing a loss function algorithm. Also, the defined bounds of the optimization threshold is a range less than or equal to a defined loss value.

Embodiment 10: The system of any of embodiments 7-9, where the loss function algorithm is a correlation-based loss function algorithm or an error-based loss function algorithm.

Embodiment 11: The system of embodiment 1, where the machine learning engine executes a Bayesian optimization algorithm to identify the plurality of test configuration settings based on historic performance metrics that characterize previous output signals generated by the radio frequency apparatus in response to operations controlled by the tester.

Embodiment 12: The system of embodiment 1, where the tester is a computer executable component stored in a computer readable storage medium comprised within the radio frequency apparatus.

Embodiment 13: The system of embodiment 1, where the tester sends the historic performance metrics to the tuner and receives the plurality of test configuration settings from the tuner via a cloud computing environment.

Embodiment 14: The system of embodiment 1, where the machine learning engine comprises computer executable components that include an initialization component that selects an initial configuration setting from the plurality of possible configuration settings; and where the system further comprises a tester that controls operation of the radio frequency apparatus in accordance with the initial configuration setting.

Embodiment 15: The system of embodiment 14, where the initialization component randomly selects the initial configuration setting.

Embodiment 16: The system of any of embodiments 14 and/or 15, where the computer executable components further include a model update components that tunes a hyperparameter of the machine learning model based on the performance metric that characterizes the output generated from a previously tested configuration setting.

Embodiment 17: The system of any of embodiments 14-16, where the computer executable components further include a candidate component that selects a test configuration setting based on the tuned machine learning model, and wherein the tester further controls the operation of the radio frequency apparatus in accordance with the test configuration setting.

Embodiment 18: The system of any of embodiments 14-17, where the target configuration setting optimizes the radio frequency apparatus for use in a time-divisional multiple access digital communications network.

Embodiment 19: A computer-implemented method for tuning a configuration setting of a radio frequency apparatus, the computer-implemented method comprising: applying a machine learning model to generate a test configuration setting for the radio frequency apparatus; generating performance evaluation data by operating the radio frequency apparatus with the test configuration setting; and comparing the performance evaluation data to a target performance dataset to determine whether the test configuration setting is an optimal configuration setting for a defined objective.

Embodiment 20: The computer-implemented method of embodiment 19, where the machine learning model is a regression model that defines a plurality of probabilistic relationships between parameters of the radio frequency apparatus that are controllable via the test configuration setting and predicted performance data.

Embodiment 21: The computer-implemented method of any of embodiments 19 and/or 20, where the machine learning model is a Gaussian process model or a Random Forest model, and where the applying the machine learning model is performed by a machine learning engine executing a Bayesian optimization algorithm.

Embodiment 22: The computer-implemented method of any of embodiments 19-21, further comprising: determining that the test configuration setting is sub-optimal based on a performance metric that characterizes the performance data being less than the optimization threshold; generating an updated machine learning model by adjusting one or more hyperparameters based on the performance evaluation data and the test configuration setting; and executing the updated machine learning model to generate a second test configuration setting for the radio frequency apparatus.

Embodiment 23: The computer-implemented method of embodiment 22, further comprising generating the performance metric by executing a loss function algorithm that compares the performance evaluation data to the target performance dataset.

Embodiment 24: The computer-implemented method of embodiment 23, where the loss function algorithm is a correlation-based loss function algorithm or an error-based loss function algorithm.

Embodiment 25: The computer-implemented method of any of embodiments 19-24, where the radio frequency apparatus is an amplifier, filter, digital signal processor, radio frequency integrated circuit, micro-electro-mechanical system filter, or monolithic microwave integrated circuit.

Embodiment 26: The computer-implemented method of any of embodiments 19-25, where the test configuration setting modulates an output signal or operating parameter of the radio frequency apparatus characterized by the performance evaluation data.

Embodiment 27: A computer program product for tuning configuration settings of a radio frequency apparatus, the computer program product comprising a computer readable storage medium having program instructions embodied therewith, the program instructions executable by one or more processors to cause the one or more processors to: control an operation of a radio frequency apparatus using an initial configuration setting; update a machine learning model based on performance evaluation data characterizing the operation of the radio frequency apparatus; and determine a test configuration setting for the radio frequency apparatus based on a prediction generated by the machine learning model regarding a second operation of the radio frequency apparatus using the test configuration setting.

Embodiment 28: The computer program product of embodiment 27, where the machine learning model is a Gaussian process model or a Random Forests model.

Embodiment 29: The computer program product of any of embodiments 27 and/or 28, where wherein the program instructions further cause the one or more processors to: execute the second operation of the radio frequency apparatus using the test configuration setting; collect additional performance evaluation data charactering the second operation of the radio frequency apparatus; and compare the additional performance evaluation data to an optimization threshold to determine whether the test configuration setting is an optimal configuration setting.

Embodiment 30: The computer program product of any of embodiments 27-29, where the program instructions further cause the one or more processors to: select the test configuration setting based on one or more performance constraints regarding the radio frequency apparatus.

Embodiment 31: The computer program product of any of embodiments 27-30, where the program instructions further cause the one or more processors to: generate the initial configuration setting based on historic performance evaluation data from a third operation of a second radio frequency apparatus.

Embodiment 32: The computer program product of any of embodiments 27-30, where the test configuration setting modulates at least one parameter of an output signal or an operation of the radio frequency apparatus.

Embodiment 33: The computer program product of embodiment 32, where the at least one parameter of the output signal includes: amplitude variation, rise time, fall time, pulse width, output power, in-band spectral emissions, out-of-band spectral emissions, error vector magnitude, or a combination thereof.

Embodiment 34: The computer program product of any of embodiments 32 and/or 33, where the at least one parameter of the operation of the radio frequency apparatus includes: filter coefficient, output power, and/or a combination thereof.

Embodiment 35: The computer program product of embodiment 27, where the program instructions further cause the one or more processors to execute a loss function algorithm to generate a performance metric that compare the performance evaluation data to a target performance data set.

Embodiment 36: The computer program product of embodiment 27, where the machine learning model is updated by fitting the machine learning model to historic data that includes the performance evaluation data.

Embodiment 37: The computer program product of embodiment 27, where the test configuration setting optimizes the radio frequency apparatus for use in a time-divisional multiple access digital communications network.

In accordance with the various embodiments described herein, one or more of the computer executable components 114 and/or computer-implemented method features described herein can be loaded onto, and/or executed by, a programmable apparatus (e.g., comprising one or more processing units 108, such as tuner 103). When executed, the computer executable components 114 and/or computer-implemented method features described herein can cause the programmable apparatus to implement one or more of the various functions and/or operations exemplified in the referenced flow diagrams and/or block diagrams.

In the flow diagrams and/or block diagrams of the Drawings, the various blocks can represent one or more modules, segments, and/or portions of computer readable instructions for implemented one or more logical functions in accordance with the various embodiments described herein. Additionally, the architecture of the system 100 and/or methods described herein is not limited to any sequential order illustrated in the Drawings. For example, two blocks shown in succession can represent functions that can be performed simultaneously. In a further example, blocks can sometimes be performed in a reverse order from the sequence shown in the Drawings. Moreover, in one or more embodiments, one or more of the illustrated blocks can be implemented by special purpose hardware based systems.

As used herein, the term "or" is intended to be inclusive, rather than exclusive. Unless specified otherwise, "X employs A or B" is intended to mean any of the natural incisive permutations. That is, if X employs A; X employs B; or X employs both A and B, the "X employs A or B" is satisfied. Additionally, the articles "a" or "an" should generally be construed to mean, unless otherwise specified, "one or more" of the respective noun. As used herein, the terms "example" and/or "exemplary" are utilized to delineate one or more features as an example, instance, or illustration. The subject matter described herein is not limited by such examples. Additionally, any aspects, features, and/or designs described herein as an "example" or as "exemplary" are not necessarily intended to be construed as preferred or advantageous. Likewise, any aspects, features, and/or designs described herein as an "example" or as "exemplary" is not meant to preclude equivalent embodiments (e.g., features, structures, and/or methodologies) known to one of ordinary skill in the art.

Understanding that is not possible to describe each and every conceivable combination of the various features (e.g., components, products, and/or methods) described herein, one of ordinary skill in the art can recognize that many further combinations and permutations of the various embodiments described herein are possible and envisaged. Furthermore, as used herein, the terms "includes," "has," "possesses," and/or the like are intended to be inclusive in a manner similar to the term "comprising" as interpreted when employed as a transitional word in a claim.

What is claimed is:

1. A system, comprising:
   a radio frequency apparatus configured to operate based on a plurality of possible configuration settings to generate an output signal that is characterized by a performance metric;
   a tuner that employs a machine learning engine having:
      a training stage and an inference stage, wherein the inference stage is configured to, based on a machine learning model, search the possible configuration settings for a target configuration setting that results in the performance metric meeting defined bounds of an optimization threshold value; and
      an initialization component that selects an initial configuration setting from the plurality of possible configuration settings; and
   a tester that controls operation of the radio frequency apparatus in accordance with the initial configuration setting.

2. The system of claim 1, wherein the tester controls operation of the radio frequency apparatus based on a plurality of test configuration settings identified by the tuner, wherein the target configuration setting is from the plurality of test configuration settings.

3. The system of claim 2, wherein the radio frequency apparatus is an amplifier, filter, digital signal processor, radio frequency integrated circuit, micro-electro-mechanical system filter, or monolithic microwave integrated circuit.

4. The system of claim 2, wherein the plurality of test configuration settings modulate at least one parameter of the output signal or operating parameter of the radio frequency apparatus.

5. The system of claim 4, wherein the at least one parameter of the output signal includes: amplitude variation, rise time, fall time, pulse width, output power, in-band spectral emissions, out-of-band spectral emissions, error vector magnitude, or a combination thereof.

6. The system of claim 4, wherein the at least one operating parameter of the radio frequency apparatus includes: filter coefficient, output power, or a combination thereof.

7. The system of claim 1, wherein the performance metric is a function of performance evaluation data that characterizes the output signal or the operating parameter of the radio frequency apparatus.

8. The system of claim 7, wherein the tuner determines the performance metric by comparing the performance evaluation data to a target performance dataset.

9. The system of claim 1, wherein the initialization component randomly selects the initial configuration setting.

10. The system of claim 1, wherein the computer executable components further include a model update component that tunes a hyperparameter of the machine learning model based on the performance metric that characterizes the output generated from a previously tested configuration setting.

11. The system of claim 1, wherein the computer executable components further include a candidate component that selects a test configuration setting based on the tuned machine learning model, and wherein the tester further controls the operation of the radio frequency apparatus in accordance with the test configuration setting.

12. The system of claim 1, wherein the target configuration setting optimizes the radio frequency apparatus for use in a time-divisional multiple access digital communications network.

13. A system, comprising:
   a radio frequency apparatus configured to operate based on a plurality of possible configuration settings to generate an output signal that is characterized by a performance metric;
   a tuner that employs a machine learning engine having:
      a training stage and an inference stage, wherein the inference stage is configured to, based on a machine learning model, search the possible configuration settings for a target configuration setting that results in the performance metric meeting defined bounds of an optimization threshold value;
      a tester that determines the performance metric by executing a loss function algorithm, wherein the defined bounds of the optimization threshold is a range less than or equal to a defined loss value, and wherein the performance metric is a function of performance evaluation data that characterizes the output signal or the operating parameter of the radio frequency apparatus.

14. The system of claim 7, wherein the loss function algorithm is a correlation-based loss function algorithm or an error-based loss function algorithm.

15. A system, comprising:
a radio frequency apparatus configured to operate based on a plurality of possible configuration settings to generate an output signal that is characterized by a performance metric; and
a tuner that employs a machine learning engine having a training stage and an inference stage, wherein the inference stage is configured to, based on a machine learning model, search the possible configuration settings for a target configuration setting that results in the performance metric meeting defined bounds of an optimization threshold value, wherein the machine learning engine executes a Bayesian optimization algorithm to identify the plurality of test configuration settings based on historic performance metrics that characterize previous output signals generated by the radio frequency apparatus in response to operations controlled by the tester.

16. The system of claim 1, wherein the tester is a computer executable component stored in a computer readable storage medium comprised within the radio frequency apparatus.

17. The system of claim 1, wherein the tester sends the historic performance metrics to the tuner and receives the plurality of test configuration settings from the tuner via a cloud computing environment.

18. A computer-implemented method for tuning a configuration setting of a radio frequency apparatus, the computer-implemented method comprising:
applying a machine learning model to generate a test configuration setting for the radio frequency apparatus;
generating performance evaluation data by operating the radio frequency apparatus with the test configuration setting, wherein the machine learning model defines a plurality of probabilistic relationships between parameters of the radio frequency apparatus that are controllable via the test configuration setting and predicted performance data; and
comparing the performance evaluation data to a target performance dataset to determine whether the test configuration setting is an optimal configuration setting for a defined objective.

19. The computer-implemented method of claim 18, wherein the machine learning model is a regression model.

20. The computer-implemented method of claim 19, wherein the machine learning model is a Gaussian process model or a Random Forest model, and wherein the applying the machine learning model is performed by a machine learning engine executing a Bayesian optimization algorithm.

21. The computer-implemented method of claim 18, wherein the radio frequency apparatus is an amplifier, filter, digital signal processor, radio frequency integrated circuit, micro-electro-mechanical system filter, or monolithic microwave integrated circuit.

22. The computer-implemented method of claim 18, wherein the test configuration setting modulates an output signal or operating parameter of the radio frequency apparatus characterized by the performance evaluation data.

23. A computer-implemented method for tuning a configuration setting of a radio frequency apparatus, the computer-implemented method comprising:
applying a machine learning model to generate a test configuration setting for the radio frequency apparatus;
generating performance evaluation data by operating the radio frequency apparatus with the test configuration setting; and
comparing the performance evaluation data to a target performance dataset to determine whether the test configuration setting is an optimal configuration setting for a defined objective;
determining that the test configuration setting is suboptimal based on a performance metric that characterizes performance data being less than the optimization threshold;
generating an updated machine learning model by adjusting one or more hyperparameters based on the performance evaluation data and the test configuration setting; and
executing the updated machine learning model to generate a second test configuration setting for the radio frequency apparatus.

24. The computer-implemented method of claim 23, further comprising:
generating the performance metric by executing a loss function algorithm that compares the performance evaluation data to the target performance dataset.

25. The computer-implemented method of claim 24, wherein the loss function algorithm is a correlation-based loss function algorithm or an error-based loss function algorithm.

26. A computer program product for tuning configuration settings of a radio frequency apparatus, the computer program product comprising a non-transitory computer readable storage medium having program instructions embodied therewith, the program instructions executable by one or more processors to cause the one or more processors to: control an operation of the radio frequency apparatus using an initial configuration setting; update a machine learning model based on performance evaluation data characterizing the operation of the radio frequency apparatus; and determine a test configuration setting for the radio frequency apparatus based on a prediction generated by the machine learning model regarding a second operation of the radio frequency apparatus using the test configuration setting, wherein the initial configuration setting is generated based on historic performance evaluation data from a third operation of a second radio frequency apparatus.

27. The computer program product of claim 26, wherein the program instructions further cause the one or more processors to:
select the test configuration setting based on one or more performance constraints regarding the radio frequency apparatus.

28. The computer program product of claim 26, wherein the test configuration setting modulates at least one parameter of an output signal or the operation of the radio frequency apparatus.

29. The computer program product of claim 28, wherein the at least one parameter of the output signal includes: amplitude variation, rise time, fall time, pulse width, output power, in-band spectral emissions, out-of-band spectral emissions, error vector magnitude, or a combination thereof.

30. The computer program product of claim 29, wherein the at least one parameter of the operation of the radio frequency apparatus includes: filter coefficient, output power, or a combination thereof.

31. The computer program product of claim 26, wherein the machine learning model is updated by fitting the machine learning model to historic data that includes the performance evaluation data.

32. The computer program product of claim 26, wherein the test configuration setting optimizes the radio frequency apparatus for use in a time-divisional multiple access digital communications network.

33. A computer program product for tuning configuration settings of a radio frequency apparatus, the computer program product comprising a non-transitory computer readable storage medium having program instructions embodied therewith, the program instructions executable by one or more processors to cause the one or more processors to: control an operation of the radio frequency apparatus using an initial configuration setting; update a machine learning model based on performance evaluation data characterizing the operation of the radio frequency apparatus; and determine a test configuration setting for the radio frequency apparatus based on a prediction generated by the machine learning model regarding a second operation of the radio frequency apparatus using the test configuration setting wherein the machine learning model is a Gaussian process model or a Random Forests model.

34. A computer program product for tuning configuration settings of a radio frequency apparatus, the computer program product comprising a non-transitory computer readable storage medium having program instructions embodied therewith, the program instructions executable by one or more processors to cause the one or more processors to: control an operation of the radio frequency apparatus using an initial configuration setting; update a machine learning model based on performance evaluation data characterizing the operation of the radio frequency apparatus; and determine a test configuration setting for the radio frequency apparatus based on a prediction generated by the machine learning model regarding a second operation of the radio frequency apparatus using the test configuration setting, wherein the program instructions further cause the one or more processors to: execute the second operation of the radio frequency apparatus using the test configuration setting; collect additional performance evaluation data charactering the second operation of the radio frequency apparatus; and compare the additional performance evaluation data to an optimization threshold to determine whether the test configuration setting is an optimal configuration setting.

35. A computer program product for tuning configuration settings of a radio frequency apparatus, the computer program product comprising a non-transitory computer readable storage medium having program instructions embodied therewith, the program instructions executable by one or more processors to cause the one or more processors to: control an operation of the radio frequency apparatus using an initial configuration setting; update a machine learning model based on performance evaluation data characterizing the operation of the radio frequency apparatus; determine a test configuration setting for the radio frequency apparatus based on a prediction generated by the machine learning model regarding a second operation of the radio frequency apparatus using the test configuration setting; and execute a loss function algorithm to generate a performance metric that compare the performance evaluation data to a target performance data set.

* * * * *